(12) United States Patent
Kobayashi

(10) Patent No.: US 11,761,811 B2
(45) Date of Patent: Sep. 19, 2023

(54) MEASUREMENT METHOD, MEASUREMENT DEVICE, MEASUREMENT SYSTEM, AND MEASUREMENT PROGRAM

(71) Applicant: Seiko Epson Corporation, Toyko (JP)

(72) Inventor: Yoshihiro Kobayashi, Komagane (JP)

(73) Assignee: SEIKO EPSON CORPORATION

( * ) Notice: Subject to any disclaimer, the term of this patent is extended or adjusted under 35 U.S.C. 154(b) by 0 days.

(21) Appl. No.: 17/203,809

(22) Filed: Mar. 17, 2021

(65) Prior Publication Data

US 2021/0293604 A1 Sep. 23, 2021

(30) Foreign Application Priority Data

Mar. 18, 2020 (JP) .................................. 2020-047306

(51) Int. Cl.
*G01G 19/03* (2006.01)
*G01H 17/00* (2006.01)

(52) U.S. Cl.
CPC .............. *G01G 19/03* (2013.01); *G01H 17/00* (2013.01)

(58) Field of Classification Search
CPC .... G01G 19/03; G01G 19/021; G01G 19/024; G01H 17/00; G01H 1/00; G01M 5/0008; G01M 5/0066
See application file for complete search history.

(56) References Cited

U.S. PATENT DOCUMENTS 4,958,306 A * 9/1990 Powell ..................... G01C 7/04
73/146
7,668,692 B2 2/2010 Tatom et al.
(Continued)

FOREIGN PATENT DOCUMENTS

JP 2009-237805 A 10/2009
JP 2017-003556 A 1/2017
(Continued)

OTHER PUBLICATIONS

U.S. Appl. No. 17/203,941, filed Mar. 17, 2021, Measurement Method, Measurement Device, Measurement System, And Measurement Program, Yoshihiro Kobayashi.
(Continued)

*Primary Examiner* — Stephanie E Bloss
(74) *Attorney, Agent, or Firm* — Harness, Dickey & Pierce, P.L.C.

(57) ABSTRACT

A measurement method includes: a step of acquiring, based on observation information obtained by an observation device, first observation point information including a time point when each of a plurality of parts of a moving object passes a first observation point of a structure and a physical quantity which is a response to an action of each of the plurality of parts on the first observation point; a step of acquiring, based on the observation information, second observation point information including a time point when each of the plurality of parts passes a second observation point and a physical quantity which is a response to an action of each of the plurality of parts on the second observation point; a step of calculating, based on the first observation point information, the second observation point information, a predetermined coefficient, and an approximate expression of deflection of the structure, a deflection waveform of the structure generated by each of the plurality of parts; and a step of calculating a deflection waveform of the structure generated by the moving object by adding the deflection waveform of the structure generated by each of the plurality of parts.

13 Claims, 15 Drawing Sheets

(56) References Cited

U.S. PATENT DOCUMENTS

| | | | |
|---|---|---|---|
| 8,094,922 B2* | 1/2012 | Lee | G01B 11/2518 |
| | | | 382/141 |
| 10,139,308 B2 | 11/2018 | Kobayashi | |
| 10,198,640 B2 | 2/2019 | Kobayashi | |
| 10,620,085 B2* | 4/2020 | Zhang | G01H 1/14 |
| 10,768,145 B2 | 9/2020 | Kobayashi | |
| 10,788,320 B2* | 9/2020 | Takada | G06T 7/0002 |
| 10,830,652 B2 | 11/2020 | Irie | |
| 2006/0137914 A1 | 6/2006 | Hodac | |
| 2009/0024336 A1 | 1/2009 | Tatom et al. | |
| 2009/0303469 A1* | 12/2009 | Lee | G06T 7/521 |
| | | | 356/237.2 |
| 2012/0173171 A1 | 7/2012 | Bajwa et al. | |
| 2016/0171309 A1* | 6/2016 | Hay | A61B 5/0077 |
| | | | 348/143 |
| 2017/0038307 A1* | 2/2017 | Ohta | G01N 21/88 |
| 2017/0097278 A1 | 4/2017 | Kobayashi | |
| 2017/0098127 A1* | 4/2017 | Kobayashi | G01M 5/0008 |
| 2017/0184471 A1 | 6/2017 | Kobayashi | |
| 2017/0184550 A1 | 6/2017 | Kobayashi | |
| 2018/0067637 A1 | 3/2018 | Hay | |
| 2018/0149554 A1 | 5/2018 | Kim et al. | |
| 2018/0224352 A1 | 8/2018 | Zhang et al. | |
| 2018/0348064 A1* | 12/2018 | Irie | G06T 7/20 |
| 2019/0025813 A1* | 1/2019 | Cella | G01M 13/045 |
| 2019/0121348 A1* | 4/2019 | Cella | G06N 3/084 |
| 2019/0212141 A1* | 7/2019 | Takada | G01B 11/16 |
| 2019/0212223 A1 | 7/2019 | Kusaka et al. | |
| 2020/0247392 A1* | 8/2020 | Omori | E01D 22/00 |
| 2020/0363287 A1 | 11/2020 | Kinoshita et al. | |
| 2021/0293604 A1 | 9/2021 | Kobayashi | |
| 2021/0293605 A1 | 9/2021 | Kobayashi | |
| 2021/0293657 A1 | 9/2021 | Kobayashi | |
| 2021/0302222 A1* | 9/2021 | Kobayashi | G01H 1/00 |
| 2021/0304597 A1 | 9/2021 | Kobayashi | |
| 2022/0136927 A1 | 5/2022 | Takada | |
| 2022/0261511 A1 | 8/2022 | Umekawa et al. | |
| 2022/0291078 A1* | 9/2022 | Kobayashi | G01M 5/0008 |

FOREIGN PATENT DOCUMENTS

| | | | | |
|---|---|---|---|---|
| JP | 2017-020796 A | | 1/2017 | |
| JP | 2018-031187 A | | 3/2018 | |
| JP | 2018-066637 A | | 4/2018 | |
| JP | 2019-049095 A | | 3/2019 | |
| JP | 6809691 B2 | | 1/2021 | |
| KR | 101163764 B1 | * | 7/2012 | |
| WO | WO-2020194539 A1 | * | 10/2020 | G01G 19/03 |

OTHER PUBLICATIONS

U.S. Appl. No. 17/203,972, filed Mar. 17, 2021, Measurement Method, Measurement Device, Measurement System, And Measurement Program, Yoshihiro Kobayashi.

U.S. Appl. No. 17/204,064, filed Mar. 17, 2021, Measurement Method, Measurement Device, Measurement System, And Measurement Program, Yoshihiro Kobayashi.

U.S. Appl. No. 17/203,799, filed Mar. 17, 2021, Measurement Method, Measurement Device, Measurement System, And Measurement Program, Yoshihiro Kobayashi.

U.S. Appl. No. 17/204,091, filed Mar. 17, 2021, Measurement Method, Measurement Device, Measurement System, And Measurement Program, Yoshihiro Kobayashi.

Xiang-rong Yuan "Acceleration Integration Method for Calculating Dynamic Deflection of Bridge"; Article Code 1671-4229 (2007) 01-0052-04; vol. 6, No. 1; Published by School of Civil Engineering, Guangzhou University, Guangzhou 510006, China; dated Feb. 2007 (total 16 pages).

* cited by examiner

FIG. 3
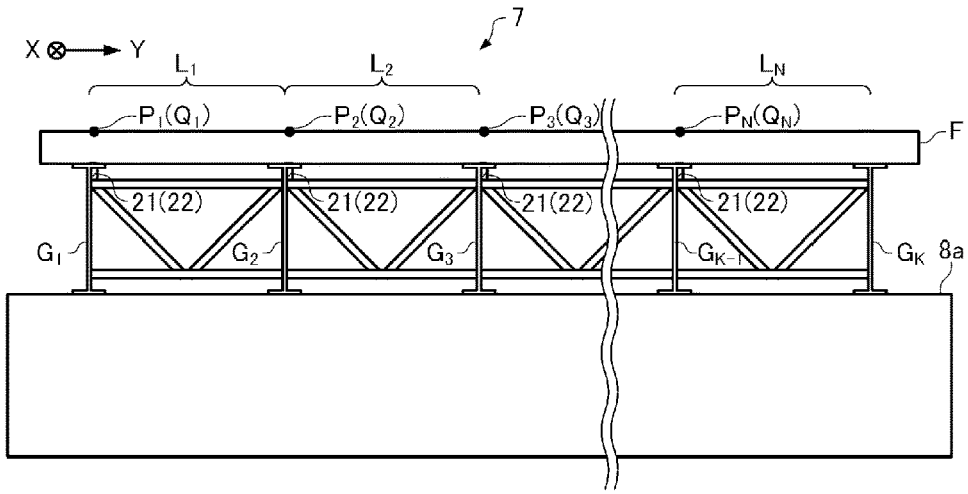
FIG. 4
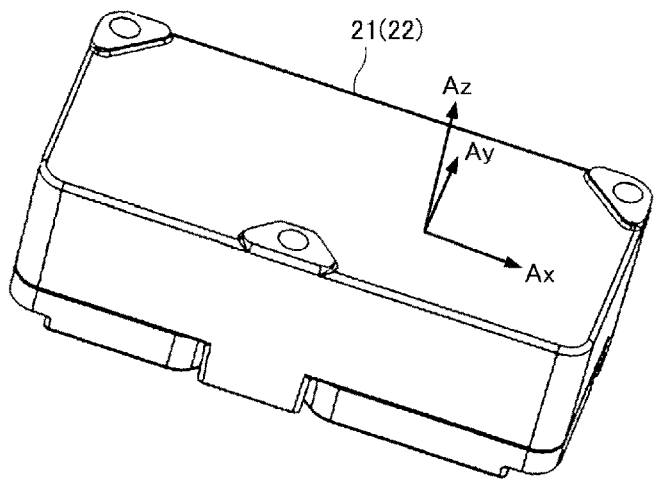
FIG. 5
| VEHICLE NUMBER | LANE NUMBER | AXLE NUMBER | ENTRY TIME POINT | ACCELERATION INTENSITY AT ENTRY TIME POINT | EXIT TIME POINT | ACCELERATION INTENSITY AT EXIT TIME POINT |
|---|---|---|---|---|---|---|
| 1 | 2 | 1 | ti11 | pai11 | to11 | pao11 |
| 1 | 2 | 2 | ti12 | pai12 | to12 | pao12 |
| 1 | 2 | 3 | ti13 | pai13 | to13 | pao13 |
| 1 | 2 | 4 | ti14 | pai14 | to14 | pao14 |
| 2 | 1 | 1 | ti21 | pai21 | to21 | pao21 |
| 2 | 1 | 2 | ti22 | pai22 | to22 | pao22 |
| 3 | 1 | 1 | ti31 | pai31 | to31 | pao31 |
| 3 | 1 | 2 | ti32 | pai32 | to32 | pao32 |
| ⋮ | | | | | | |

FIG. 9
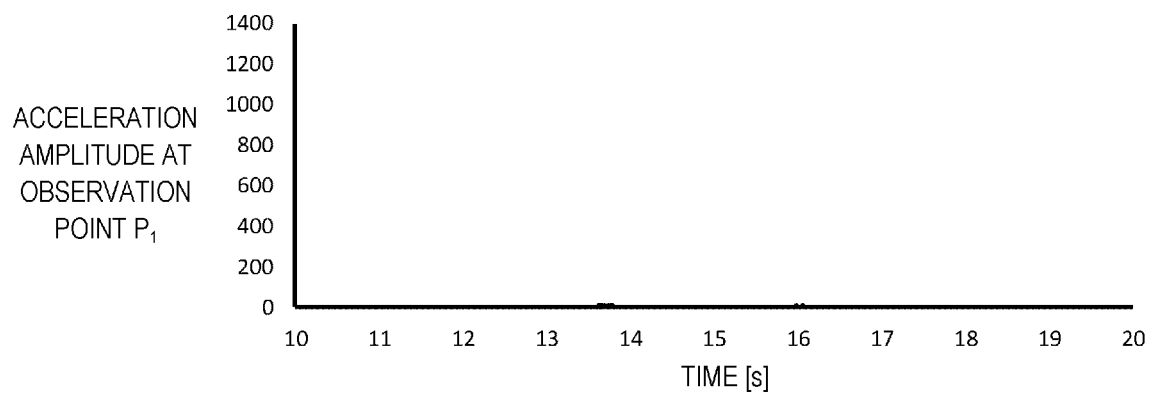
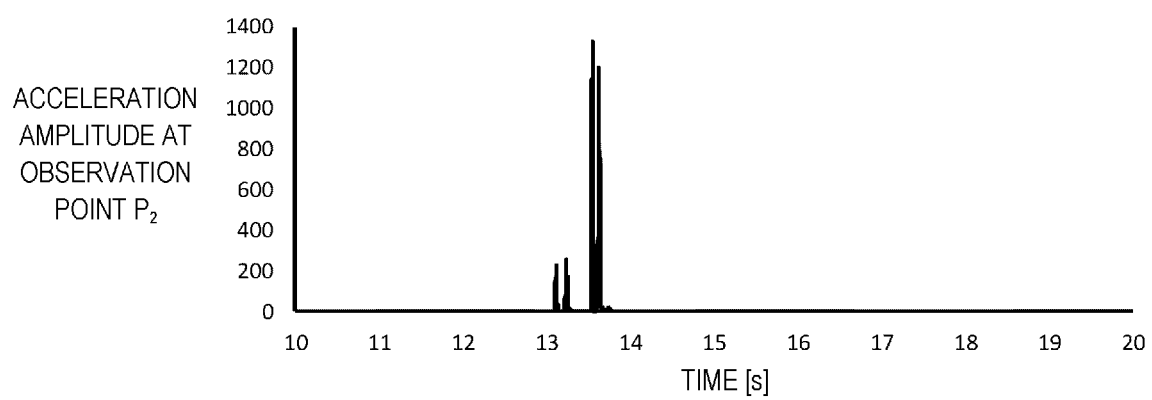
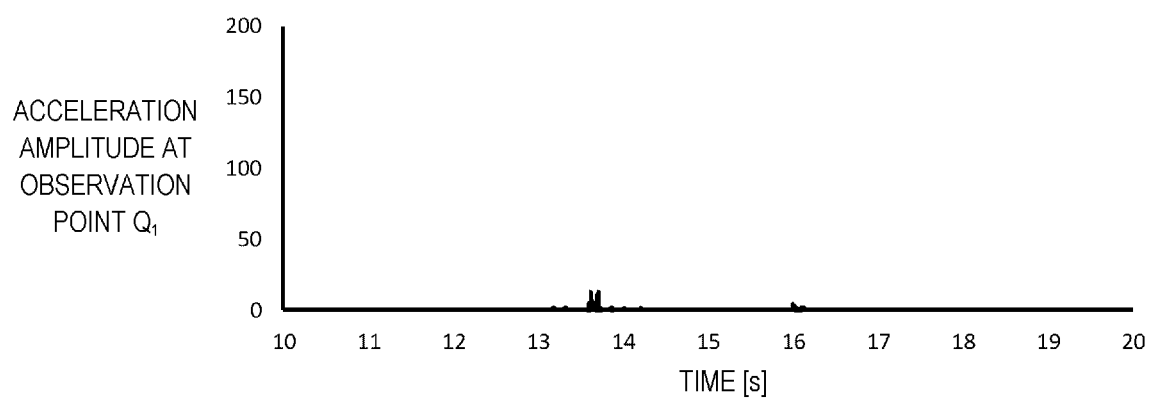
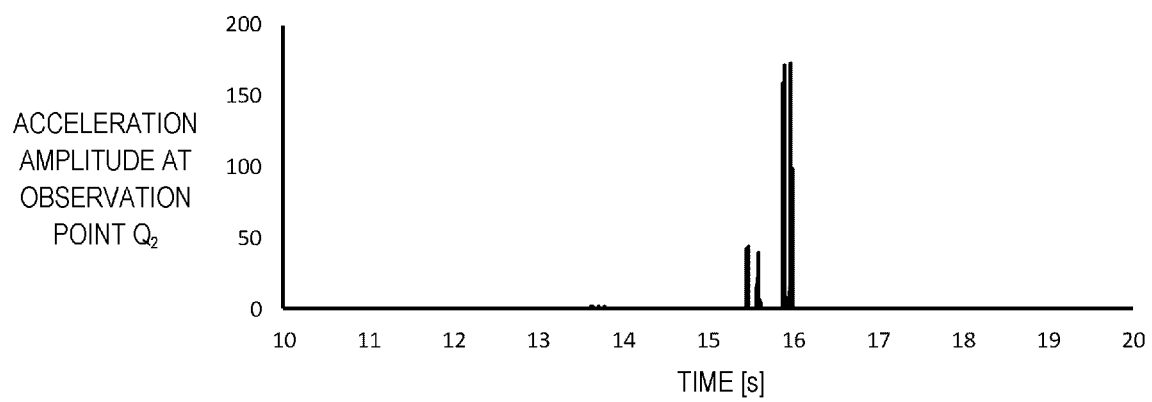

MEASUREMENT METHOD, MEASUREMENT DEVICE, MEASUREMENT SYSTEM, AND MEASUREMENT PROGRAM

The present application is based on, and claims priority from JP Application Serial Number 2020-047306, filed Mar. 18, 2020, the disclosure of which is hereby incorporated by reference herein in its entirety.

BACKGROUND

1. Technical Field

The present disclosure relates to a measurement method, a measurement device, a measurement system, and a measurement program.

2. Related Art

In maintaining and managing a bridge, an axle load of a large vehicle passing through the bridge is important information for predicting damage to the bridge. For axle load measurement, JP-A-2009-237805 proposes weight in motion, which is a method of continuously measuring a strain value when the vehicle passes from a strain gauge installed on a main girder of the bridge and calculating the axle load. JP-A-2009-237805 discloses a bridge-passing vehicle monitoring system that measures a vehicle weight of a vehicle passing through a bridge based on a strain waveform measured by a strain gauge arranged on a main girder of the bridge.

Specifically, in the bridge-passing vehicle monitoring system, the strain gauge is arranged, a passage timing of the axle is detected based on the strain waveform measured by the strain gauge, an inter-axle ratio of the vehicle is calculated, the calculated inter-axle ratio is compared with an inter-axle ratio calculated based on an inter-axle distance registered in an inter-axle distance database, and the inter-axle distance, a vehicle speed, and a vehicle type of the vehicle are identified. The bridge-passing vehicle monitoring system generates a strain waveform in which a reference axle load strain waveform is arranged on a time axis according to the passage timing of the axle, and calculates the axle load of each axle by comparing the reference axle load strain waveform with a strain waveform measured by the strain gauge. Then, the bridge-passing vehicle monitoring system calculates the vehicle weight by summing the axle loads of each axle.

However, in the system described in JP-A-2009-237805, the vehicle weight of the vehicle can be measured without measuring a displacement of the bridge by using the strain waveform and the inter-axle distance database. However, based on the strain waveform measured by the strain gauge, it is not possible to calculate the deflection waveform of the structure generated by the moving object such as the vehicle that moves on the structure such as the bridge.

SUMMARY

A measurement method according to a first aspect of the present disclosure includes: a first observation point information acquisition step of acquiring, based on observation information obtained by an observation device that observes, among a first observation point and a second observation point which are arranged along a first direction in which a moving object moves on a structure, the first observation point, first observation point information including a time point when each of a plurality of parts of the moving object passes the first observation point and a physical quantity which is a response to an action of each of the plurality of parts on the first observation point; a second observation point information acquisition step of acquiring, based on observation information obtained by an observation device that observes the second observation point, second observation point information including a time point when the plurality of parts passes the second observation point and a physical quantity which is a response to an action of each of the plurality of parts on the second observation point; a deflection waveform calculation step of calculating, based on the first observation point information, the second observation point information, a predetermined coefficient, and an approximate expression of deflection of the structure, a deflection waveform of the structure generated by each of the plurality of parts; and a moving object deflection waveform calculation step of calculating a deflection waveform of the structure generated by the moving object by adding the deflection waveform of the structure generated by each of the plurality of parts and calculated in the deflection waveform calculation step.

In the measurement method according to the first aspect, the first observation point may be set at a first end portion of the structure, and the second observation point may be set at a second end portion of the structure different from the first end portion.

In the measurement method according to the first aspect, the moving object may be a railroad vehicle, an automobile, a tram, a construction vehicle, or a military vehicle, and the plurality of parts may be axles or wheels.

In the measurement method according to the first aspect, the approximate expression of deflection of the structure may be an expression normalized by a maximum amplitude of deflection at a central position between the first observation point and the second observation point.

In the measurement method according to the first aspect, the approximate expression of deflection of the structure may be an expression based on a structural model of the structure.

In the measurement method according to the first aspect, the structural model may be a simple beam that supports both ends.

In the measurement method according to the first aspect, the approximate expression of deflection of the structure may be an expression of a sinusoidal half-wave waveform.

In the measurement method according to the first aspect, the structure may be a superstructure of a bridge, the superstructure may be a structure across any one of a bridge abutment and a bridge pier adjacent to each other, two adjacent bridge abutments, or two adjacent bridge piers, both end portions of the superstructure may be located at positions of the bridge abutment and the bridge pier adjacent to each other, at positions of the two adjacent bridge abutments, or at positions of the two adjacent bridge piers, and the bridge may be a road bridge or a railway bridge.

In the measurement method according to the first aspect, the predetermined coefficient may be a coefficient of a function that approximates a correlation between a deflection of a portion of the structure between the first observation point and the second observation portion and a displacement of the portion of the structure or a load applied to the portion of the structure.

In the measurement method according to the first aspect, the observation device that observes the first observation point, and the observation device that observes the second observation point may be acceleration sensors.

In the measurement method according to the first aspect, the observation device that observes the first observation point and the observation device that observes the second observation point may be impact sensors, microphones, strain gauges, or load cells.

In the measurement method according to the first aspect, the structure may be a structure in which bridge weigh in motion (BWIM) functions.

A measurement device according to a second aspect of the present disclosure includes: a first observation point information acquisition unit that acquires, based on observation information obtained by an observation device that observes, among a first observation point and a second observation point which are arranged along a first direction in which a moving object moves on a structure, the first observation point, first observation point information including a time point when each of a plurality of parts of the moving object passes the first observation point and a physical quantity which is a response to an action of each of the plurality of parts on the first observation point; a second observation point information acquisition unit that acquires, based on observation information obtained by an observation device that observes the second observation point, second observation point information including a time point when each of the plurality of parts passes the second observation point and a physical quantity which is a response to an action of each of the plurality of parts on the second observation point; a deflection waveform calculation unit that calculates, based on the first observation point information, the second observation point information, a predetermined coefficient, and an approximate expression of deflection of the structure, a deflection waveform of the structure generated by each of the plurality of parts; and a moving object deflection waveform calculation unit that calculates a deflection waveform of the structure generated by the moving object by adding the deflection waveform of the structure generated by each of the plurality of parts and calculated in the deflection waveform calculation unit.

A measurement system according to a third aspect of the present disclosure includes: the measurement device according to the first aspect; the observation device that observes the first observation point; and the observation device that observes the second observation point.

A non-transitory computer-readable storage medium according to a fourth aspect of the present disclosure stores a measurement program, the measurement program causing a computer to execute: a first observation point information acquisition step of acquiring, based on observation information obtained by an observation device that observes, among a first observation point and a second observation point which are arranged along a first direction in which a moving object moves on a structure, the first observation point, first observation point information including a time point when each of a plurality of parts of the moving object passes the first observation point and a physical quantity which is a response to an action of each of the plurality of parts on the first observation point; a second observation point information acquisition step of acquiring, based on observation information obtained by an observation device that observes the second observation point, second observation point information including a time point when the plurality of parts passes the second observation point and a physical quantity which is a response to an action of each of the plurality of parts on the second observation point; a deflection waveform calculation step of calculating, based on the first observation point information, the second observation point information, a predetermined coefficient, and an approximate expression of deflection of the structure, a deflection waveform of the structure generated by each of the plurality of parts; and a moving object deflection waveform calculation step of calculating a deflection waveform of the structure generated by the moving object by adding the deflection waveform of the structure generated by each of the plurality of parts and calculated in the deflection waveform calculation step.

BRIEF DESCRIPTION OF THE DRAWINGS

FIG. 3 is a diagram showing an arrangement example of the sensors and the observation points.

FIG. 4 is a diagram illustrating an acceleration detected by an acceleration sensor.

FIG. 5 is a diagram showing an example of axle information.

FIG. 9 shows diagrams in which an acceleration amplitude at each time point in FIG. 8 is converted into an acceleration intensity.

DESCRIPTION OF EXEMPLARY EMBODIMENTS

Hereinafter, embodiments of the present disclosure will be described in detail with reference to the drawings. The embodiments described below do not in any way limit contents of the present disclosure described in the appended claims. Not all configurations described below are necessarily essential components of the present disclosure.

1. First Embodiment 1-1. Measurement System

Hereinafter, a measurement system for implementing a measurement method according to the present embodiment will be described by taking a case where a structure is a superstructure of a bridge and a moving object is a vehicle as an example. The vehicle passing through the bridge according to the present embodiment is a vehicle having a large weight such as a railroad vehicle, an automobile, a tram, a construction vehicle, or a military vehicle, and can be measured by bridge weigh in motion (BWIM). The BWIM is a technology that uses a bridge as a "scale" and that measures the weight and the number of axles of the vehicle passing through the bridge by measuring deformation of the bridge. The superstructure of the bridge, which enables analysis of the weight of the vehicle passing by based on a response such as deformation and strain, is a structure in which the BWIM functions. A BWIM system, which applies a physical process between an action on the superstructure of the bridge and the response, enables the measurement of the weight of the vehicle passing by.

Figure 1:
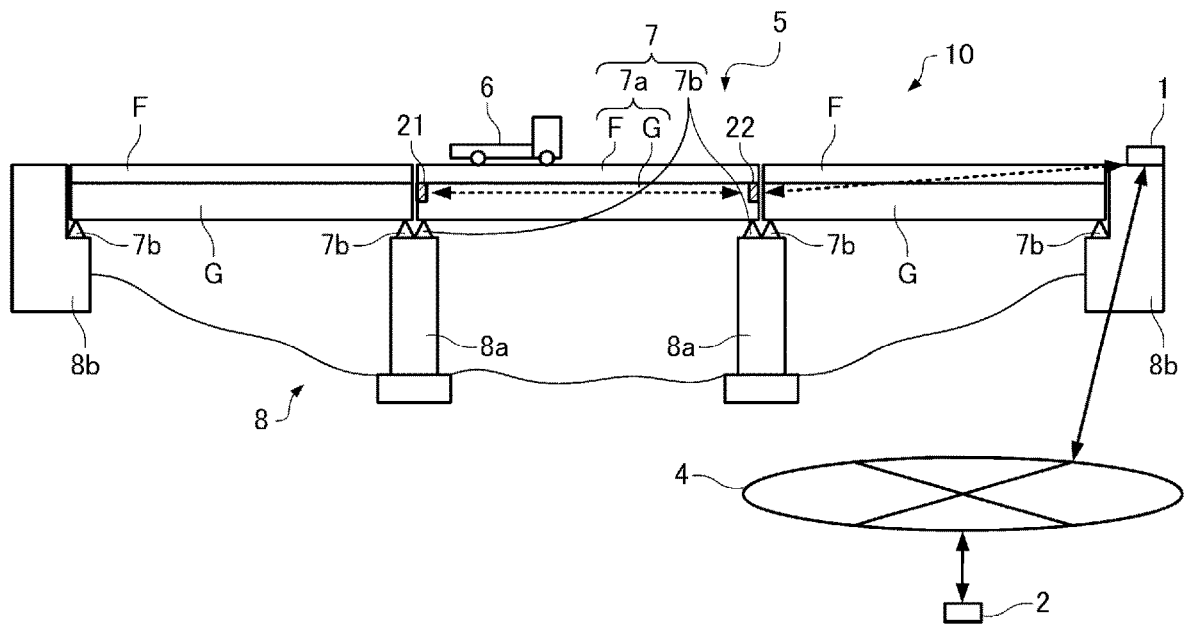
FIG. 1 is a diagram showing a configuration example of a measurement system.

FIG. 1 is a diagram showing an example of a measurement system according to the present embodiment. As shown in FIG. 1, a measurement system 10 according to the present embodiment includes a measurement device 1, and at least one sensor 21 and at least one sensor 22 which are provided on a superstructure 7 of a bridge 5. The measurement system 10 may include a server 2.

The bridge 5 is formed of the superstructure 7 and a substructure 8. The superstructure 7 includes abridge floor 7a formed of a floor plate F, a main girder G, a cross girder which is not shown, and bearings 7b. The substructure 8 includes bridge piers 8a and bridge abutments 8b. The superstructure 7 is a structure across any one of the bridge abutment 8b and the bridge pier 8a adjacent to each other, two adjacent bridge abutments 8b, or two adjacent bridge piers 8a. Both end portions of the superstructure 7 are located at positions of the bridge abutment 8b and the bridge pier 8a adjacent to each other, at positions of the two adjacent bridge abutments 8b, or at positions of the two adjacent bridge piers 8a.

The measurement device 1 and the sensors 21, and 22 are coupled by, for example, a cable which is not shown and communicate with one another via a communication network such as a controller area network (CAN). Alternatively, the measurement device 1 and the sensors 21 and 22 may communicate with one another via a wireless network.

For example, each sensor 21 outputs data representing an impact caused by entry of the vehicle 6 which is a moving object to the superstructure 7. Each sensor 22 outputs data representing an impact caused by exit of the vehicle 6 from the superstructure 7. In the present embodiment, each of the sensors 21 and 22 is an acceleration sensor, and may be, for example, a crystal acceleration sensor or a micro electro mechanical systems (MEMS) acceleration sensor.

In the present embodiment, each sensor 21 is installed at a first end portion of the superstructure 7 in a longitudinal direction. Each sensor 22 is installed at a second end portion of the superstructure 7 which is different from the first end portion in the longitudinal direction.

Each sensor 21 detects an acceleration of the superstructure 7 generated when the vehicle 6 enters the superstructure 7. Each sensor 22 detects the acceleration of the superstructure 7 generated when the vehicle 6 exits the superstructure 7. That is, in the present embodiment, each sensor 21 is an acceleration sensor that detects the entry of the vehicle 6 to the superstructure 7. Each sensor 22 is an acceleration sensor that detects the exit of the vehicle 6 from the superstructure 7.

The measurement device 1 calculates a displacement of bending of the superstructure 7 due to the traveling of the vehicle 6 based on acceleration data output from the sensors 21 and 22.

The measurement device 1 and the server 2 can communicate with each other via, for example, a wireless network of a mobile phone and a communication network 4 such as the Internet. The measurement device 1 transmits, to the server 2, information such as a time point when the vehicle 6 travels on the superstructure 7 and the displacement of the superstructure 7 due to the traveling of the vehicle 6. The server 2 may store the information in a storage device which is not shown, and may perform, based on the information, processing such as monitoring of an overloaded vehicle or determination of an abnormality in the superstructure 7.

In the present embodiment, the bridge 5 is a road bridge, for example, a steel bridge, a girder bridge, or a reinforced-concrete (RC) bridge.

Figure 2:
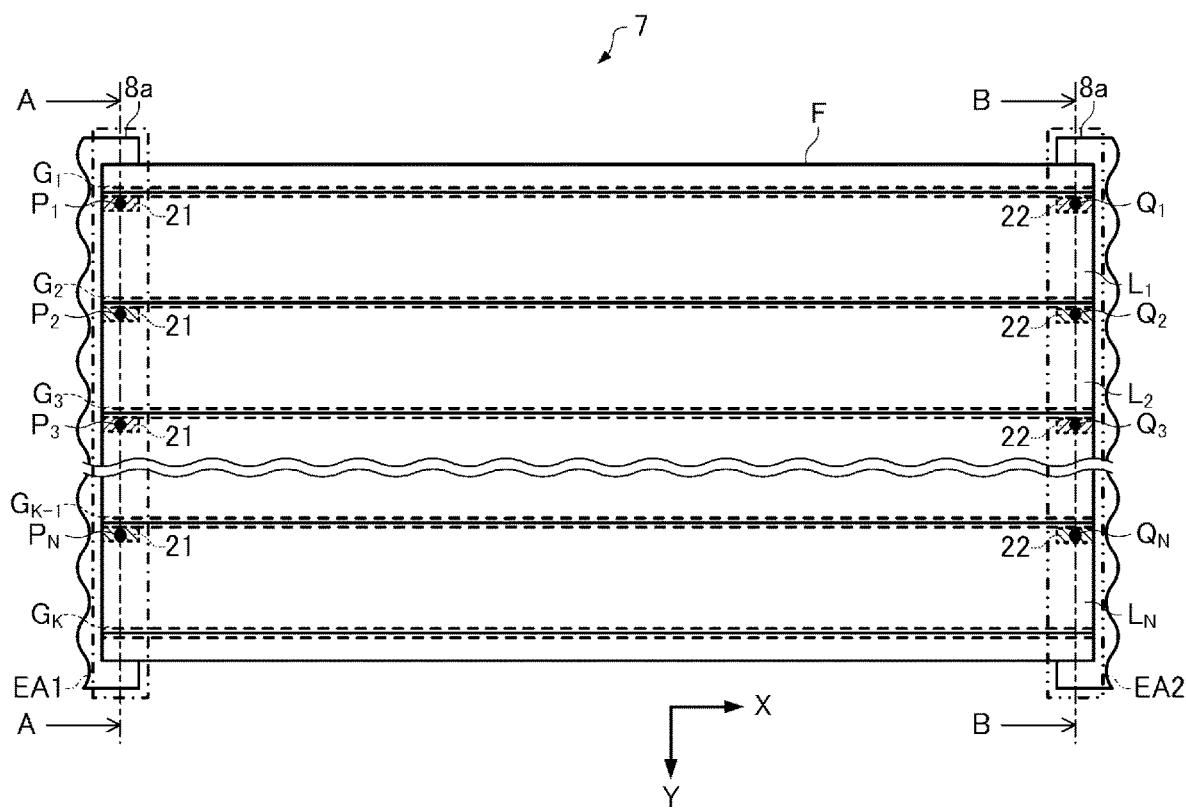
FIG. 2 is a diagram showing an arrangement example of sensors and observation points.

FIGS. 2 and 3 are diagrams showing installation examples of the sensors 21 and 22 on the superstructure 7. FIG. 2 is a diagram of the superstructure 7 as viewed from above. FIG. 3 is a cross-sectional view of FIG. 2 cut along a line A-A or a line B-B.

As shown in FIGS. 2 and 3, the superstructure 7 has N lanes $L_1$ to $L_N$ and K main girders $G_1$ to $G_K$ as first to N-th paths through which the vehicle 6, which is the moving object, can move. Here, N and K are integers of 1 or more. In examples shown in FIGS. 2 and 3, each position of the main girders $G_1$ to $G_K$ coincides with a position of each boundary between the lanes $L_1$ to $L_N$, and N=K−1. Alternatively, each position of the main girders $G_1$ to $G_K$ does not have to coincide with the position of each boundary between the lanes $L_1$ to $L_N$, and N≠K−1.

In the examples shown in FIGS. 2 and 3, the sensor 21 is provided on each of the main girders $G_1$ to $G_{K-1}$ at a first end portion EA1 of the superstructure 7 in the longitudinal direction. The sensor 22 is provided on each of the main girders $G_1$ to $G_{K-1}$ at a second end portion EA2 of the superstructure 7 in the longitudinal direction. In the examples shown in FIGS. 2 and 3, N=K−1, and the sensors 21 and 22 are not provided on the main girder $G_K$. However, the sensors 21 and 22 may be provided on the main girder $G_K$, and the sensors 21 and 22 may not be provided on any one of the main girders $G_1$ to $G_{K-1}$. Alternatively, N=K, and the sensors 21 and 22 may be provided on the main girders $G_1$ to $G_K$.

When the sensors 21 and 22 are provided on the floor plate F of the superstructure 7, the sensors may be destroyed by a traveling vehicle, and measurement accuracy may be influenced by local deformation of the bridge floor 7a. Therefore, in the examples shown in FIGS. 2 and 3, the sensors 21 and 22 are provided on the main girders $G_1$ to $G_{K-1}$ of the superstructure 7.

In the present embodiment, N observation points $P_1$ to $P_N$ are set in association with the N sensors 21. The observation points $P_1$ to $P_N$ are N observation points for the superstructure 7 arranged along a second direction intersecting a first direction in which the vehicle 6 moves along the superstructure 7. In the examples shown in FIGS. 2 and 3, for each integer j of 1 or more and N or less, an observation point $P_j$ is set at a position on a surface of the floor plate F in a vertically upward direction of the sensor 21 provided on a main girder $G_j$ at the first end portion EA1. That is, the sensor 21 provided on the main girder $G_j$ is an observation device that observes the observation point $P_j$. The sensor 21 that observes the observation point $P_j$ may be provided at a position where the acceleration generated at the observation point $P_j$ due to the traveling of the vehicle 6 can be detected, and it is desirable that the sensor 21 is provided at a position close to the observation point $P_j$. In this way, the observation points $P_1$ to $P_N$ have a one-to-one relationship with the N sensors 21.

In the present embodiment, N observation points $Q_1$ to $Q_N$ are set in association with the N sensors 22. The observation points $Q_1$ to $Q_N$ are N observation points for the superstructure 7 arranged along a third direction intersecting the first direction in which the vehicle 6 moves along the superstructure 7. In the examples shown in FIGS. 2 and 3, for each integer j or 1 more and N or less, an observation point $Q_j$ is set at a position on the surface of the floor plate F in a vertically upward direction of the sensor 22 provided on the main girder $G_j$ at the second end portion EA2. That is, the sensor 22 provided on the main girder $G_j$ is an observation device that observes the observation point $Q_j$. The sensor 22 that observes the observation point $Q_j$ may be provided at a position where the acceleration generated at the observation point $Q_j$ due to the traveling of the vehicle 6 can be detected, and it is desirable that the sensor 22 is provided at a position close to the observation point $Q_j$. In this way, the observation points $Q_1$ to $Q_N$ have a one-to-one relationship with the N sensors 22.

In the present embodiment, the N observation points $P_1$ to $P_N$ are associated with the lanes $L_1$ to $L_N$, respectively. Similarly, the N observation points $Q_1$ to $Q_N$ are associated with the lanes $L_1$ to $L_N$, respectively. The observation point $P_j$ and the observation point $Q_j$, which are set in association with the lane $L_j$, are arranged along the first direction in which the vehicle 6 moves along the superstructure 7. In the examples shown in FIGS. 2 and 3, the first direction is an X direction along the lanes $L_1$ to $L_N$ of the superstructure 7, that is, the longitudinal direction of the superstructure 7. The second direction and the third direction are a Y direction orthogonal to the X direction in a surface of the superstructure 7 on which the vehicle 6 travels, that is, a width direction of the superstructure 7. However, when the lanes $L_1$ to $L_N$ are curved, the second direction and the third direction do not have to coincide with each other. The second direction and the third direction do not have to be orthogonal to the first direction. For example, a distance from an end of the superstructure 7 on a side where the vehicle 6 enters to the observation points $P_1$ to $P_N$ and a distance from an end of the superstructure 7 on a side where the vehicle 6 exits to the observation points $Q_1$ to $Q_N$ may be different. For each integer j of 1 or more and N or less, the observation point $P_j$ is an example of a "first observation point", and the observation point $Q_j$ is an example of a "second observation point".

The number and installation positions of the N sensors 21 and 22 are not limited to the examples shown in FIGS. 2 and 3, and various modifications can be made.

The measurement device 1 acquires, based on the acceleration data output from each of the sensors 21 and 22, an acceleration in a fourth direction which intersects the X direction, which is the first direction, and the Y direction, which is the second direction and the third direction. The observation points $P_1$ to $P_N$ and $Q_1$ to $Q_N$ are displaced by an impact in a direction orthogonal to the X and Y directions. Therefore, in order to accurately calculate a magnitude of the impact, it is desirable for the measurement device 1 to acquire the acceleration in the fourth direction orthogonal to the X and Y directions, that is, in a normal direction of the floor plate F.

FIG. 4 is a diagram illustrating the acceleration detected by the sensors 21 and 22. The sensors 21 and 22 are acceleration sensors that detect the accelerations generated in three axes orthogonal to one another.

In order to detect the impact applied to the observation points $P_1$ to $P_N$ due to the entry of the vehicle 6 to the superstructure 7, each sensor 21 is installed such that one of three detection axes, which are an x axis, a y axis, and a z axis, intersects the first direction and the second direction. Similarly, in order to detect the impact applied to the observation points $Q_1$ to $Q_N$ due to the exit of the vehicle 6 from the superstructure 7, each sensor 22 is installed such that one of the three detection axes, which are the x axis, the y axis, and the z axis, intersects the first direction and the third direction. In the examples shown in FIGS. 2 and 3, since the first direction is the X direction, the second direction and the third direction are the Y direction, the sensors 21 and 22 are installed such that one axis intersects the X direction and the Y direction. The observation points $P_1$ to $P_N$ and $Q_1$ to $Q_N$ are displaced by the impact in the direction orthogonal to the X direction and the Y direction. Therefore, in order to accurately detect the magnitude of the impact, ideally, the sensors 21 and 22 are installed such that one axis is in the direction orthogonal to the X direction and the Y direction, that is, the normal direction of the floor plate F.

When the sensors 21 and 22 are installed on the superstructure 7, an installation location may be inclined. In the measurement device 1, even if one of the three detection axes of each of the sensors 21 and 22 is not installed in the normal direction of the floor plate F, since the direction is substantially oriented in the normal direction, an error is small and thus can be ignored. The measurement device 1 can correct a detection error due to the inclination of the sensors 21 and 22 by a three-axis combined acceleration that combines the accelerations in the x axis, the y axis, and the z axis even if one of the three detection axes of each of the sensors 21 and 22 is not installed in the normal direction of the floor plate F. Each of the sensors 21 and 22 may be a one-axis acceleration sensor that detects the acceleration generated in a direction at least substantially parallel to the vertical direction or the acceleration in the normal direction of the floor plate F.

Hereinafter, details of the measurement method according to the present embodiment executed by the measurement device 1 will be described.

1-2. Generation of Axle Information

In the present embodiment, the measurement device acquires, based on the acceleration data, which is observation information obtained by the N sensors 21 as the observation device, first observation point information including a time point when each of a plurality of parts of the vehicle 6 which is the moving object passes the observation point $P_j$ and a physical quantity which is a response to an action of each of the plurality of parts on the observation point P Similarly, in the present embodiment, the measurement device acquires, based on the acceleration data, which is observation information obtained by the N sensors 22 as the observation device, second observation point information including a time point when each of the plurality of parts of the vehicle 6 passes the observation point $Q_j$ and a physical quantity which is a response to an action of each of the plurality of parts on the observation point $Q_j$. Here, j is an integer of 1 or more and N or less.

In the present embodiment, it is considered that a load generated by a plurality of axles or wheels of the vehicle 6 is applied to the superstructure 7. Accordingly, each of the plurality of parts for which the first observation point information and the second observation point information are to be acquired is an axle or a wheel. Hereinafter, in the present embodiment, it is assumed that each of the plurality of parts is an axle.

In the present embodiment, each sensor 21, which is the acceleration sensor, detects the acceleration due to the action of each of the plurality of axles on the observation point $P_j$. Similarly, each sensor 22, which is the acceleration sensor, detects the acceleration due to the action of each of the plurality of axles on the observation point $Q_j$.

In the present embodiment, as shown in FIG. 2, the observation points $P_1$ to $P_N$ are set at the first end portion EA1, and the observation points $Q_1$ to $Q_N$ are set at the second end portion EA2. Therefore, a time point when each of the plurality of axles of the vehicle 6 passes the observation point $P_j$ can be regarded as an entry time point of each axle to the superstructure 7 and, more specifically, an entry time point to the lane $L_j$. A time point when each of the plurality of axles of the vehicle 6 passes the observation point $Q_j$ can be regarded as an exit time point of each axle from the superstructure 7, and more specifically, an exit time point from the lane $L_j$.

Therefore, in the present embodiment, the first observation point information includes an entry time point of each axle of the vehicle 6 to the lane $L_j$ and acceleration intensity as the physical quantity that is the response to the action when each axle enters the lane $L_j$. The second observation point information includes an exit time point of each axle of the vehicle 6 from the lane $L_j$ and acceleration intensity as a physical quantity that is the response to the action when each axle exits the lane $L_j$.

Further, since the entry and the exit of each axle of the vehicle 6 correspond to each other, the first observation point information and the second observation point information can be stratified. The first observation point information, the second observation point information, and stratified information thereof are collectively referred to as axle information.

That is, in addition to the first observation point information and the second observation point information, the axle information includes correspondence information on the entry time point to the lane $L_j$ and the acceleration intensity at the time of entry, the exit time point from the lane $L_j$ and the acceleration intensity at the time of exit for each axle, and correspondence information between the vehicle 6 and the above corresponding information for each axle. Therefore, with the axle information, for each vehicle 6 passing through the superstructure 7, the time points when each axle passes the lane $L_j$ and the observation points $P_j$ and $Q_j$, and the acceleration intensities at the time of passing are identified.

FIG. 5 shows an example of the axle information. In the example in FIG. 5, information in first to fourth rows is information related to the vehicle 6 whose vehicle number is 1. Information in the first row is information related to a leading axle whose axle number is 1. Information in the second row is information related to a second axle whose axle number is 2. Information in the third row is information related to a third axle whose axle number is 3. Information in the fourth row is information related to a fourth axle whose axle number is 4. For example, the correspondence information in the first row shows that, for the leading axle, whose axle number is 1, of the vehicle 6 whose vehicle number is 1, the entry time point to the lane $L_2$ is ti11, the acceleration intensity at the time of the entry is pai11, the exit time point from the lane $L_2$ is to11, and the acceleration intensity at the time of the exit is pao11.

Information in fifth and sixth rows is information related to the vehicle 6 whose vehicle number is 2. The information in the fifth row is the correspondence information related to the leading axle whose axle number is 1. The information in the sixth row is the correspondence information related to the second axle whose axle number is 2. For example, the correspondence information in the fifth row shows that, for the leading axle, whose axle number is 1, of the vehicle 6 whose vehicle number is 2, the entry time point to the lane $L_1$ is ti21, the acceleration intensity at the time of the entry is pai21, the exit time point from the lane $L_1$ is to21, and the acceleration intensity at the time of the exit is pao21.

Information in seventh and eighth rows is information related to the vehicle 6 whose vehicle number is 3. The information in the seventh row is the correspondence information related to the leading axle whose axle number is 1. The information in the eighth row is the correspondence information related to the second axle whose axle number is 2. For example, the correspondence information in the seventh row shows that, for the leading axle, whose axle number is 1, of the vehicle 6 whose vehicle number is 3, the entry time point to the lane $L_1$ is ti31, the acceleration intensity at the time of the entry is pai31, the exit time point from the lane $L_1$ is to31, and the acceleration intensity at the time of the exit is pao31.

Figure 6:
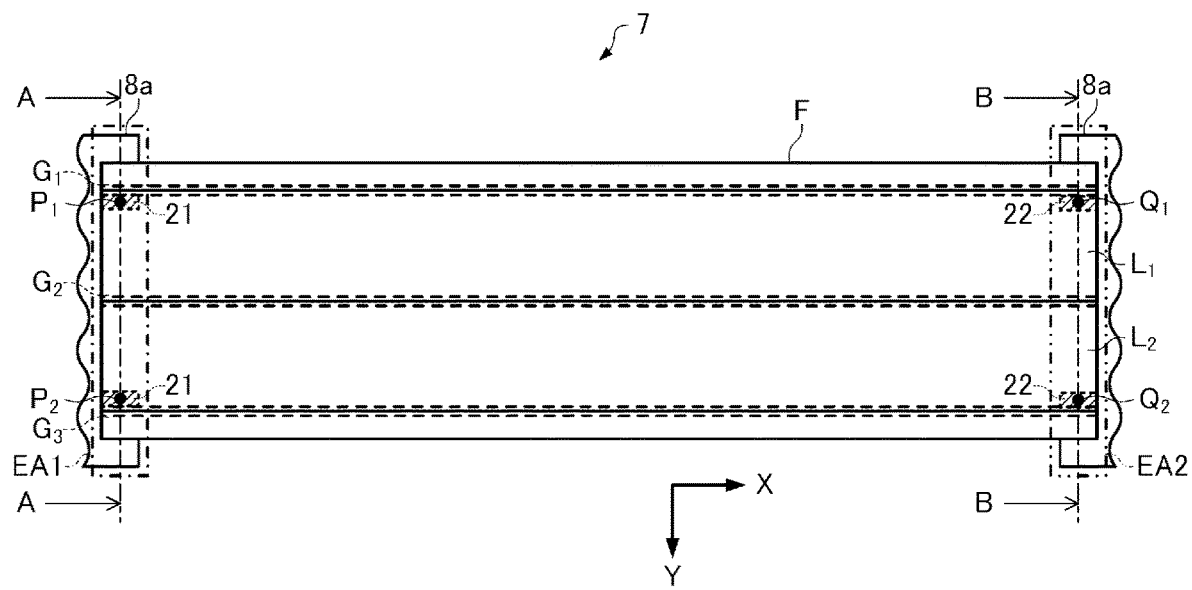
FIG. 6 is a diagram showing an arrangement example of the sensors and the observation points.
Figure 7:
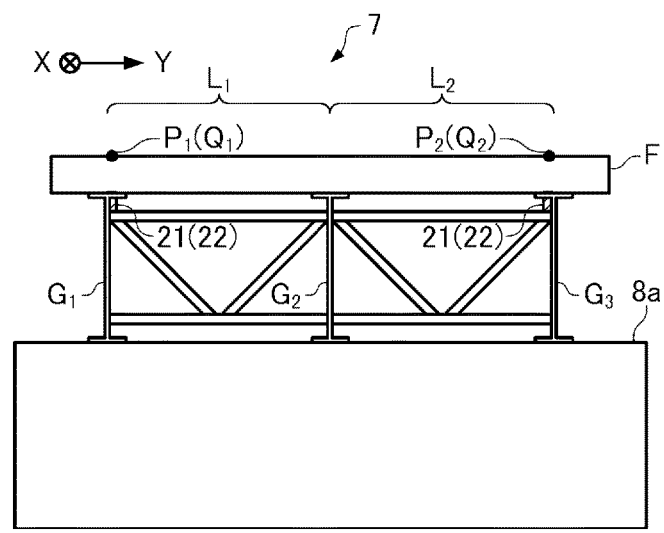
FIG. 7 is a diagram showing an arrangement example of the sensors and the observation points.

As an example, FIGS. 6 and 7 show arrangement examples of the sensors 21 and 22 and the observation points $P_1$, $P_2$, $Q_1$, and $Q_2$ when N=2. In the case of the arrangement examples shown in FIGS. 6 and 7, a procedure for the measurement device 1 to generate the axle information will be described.

FIG. 6 is a diagram of the superstructure 7 as viewed from above. FIG. 7 is a cross-sectional view of FIG. 6 cut along a line A-A or a line B-B. In the examples shown in FIGS. 6 and 7, one sensor 21 is provided on each of the main girders $G_1$ and $G_3$ at the first end portion EA1 of the superstructure 7. One sensor 22 is provided on each of the main girders $G_1$ and $G_3$ at the second end portion EA2 of the superstructure 7. Observation points $P_1$ and $Q_1$ corresponding to the lane $L_1$ are respectively set at the positions on the surface of the floor plate F in the vertically upward direction of the sensors 21 and 22 provided on the main girder $G_1$. Observation points $P_2$ and $Q_2$ corresponding to the lane $L_2$ are respectively set at the positions on the surface of the floor plate F in the vertically upward direction of the sensors 21 and 22 provided on the main girder $G_3$. The sensor 21 provided on the main girder $G_1$ observes the observation point $P_1$. The sensor 21 provided on the main girder $G_3$ observes the observation point $P_2$. The sensor 22 provided on the main girder $G_1$ observes the observation point $Q_1$. The sensor 22 provided on the main girder $G_3$ observes the observation point $Q_2$. In order to generate the axle information, the measurement device 1 converts the acceleration at each time point detected by each of the sensors 21 and 22 into an amplitude, and acquires the acceleration intensity.

Figure 8:
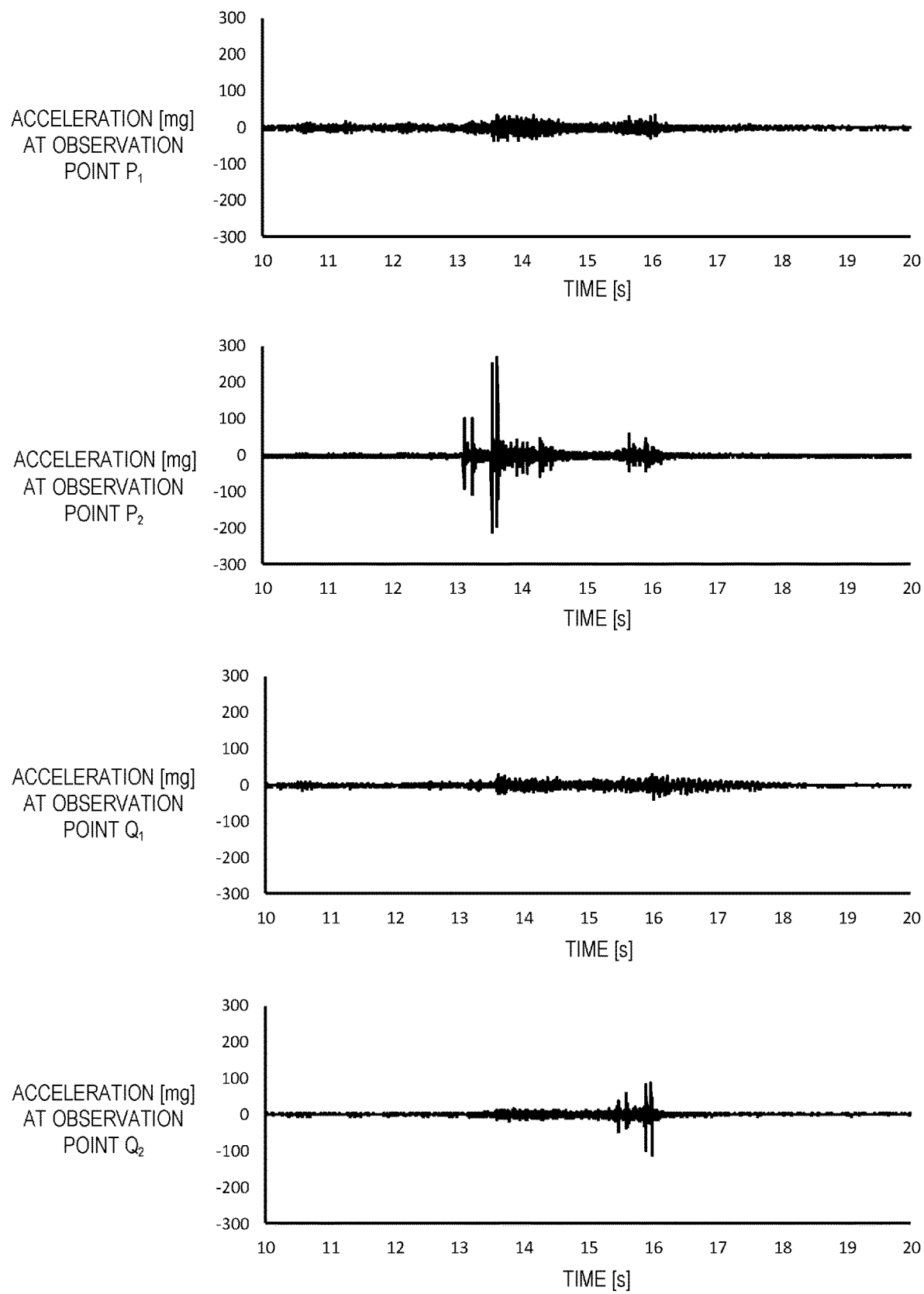
FIG. 8 shows diagrams showing examples of an acceleration detected with respect to an observation point.

FIG. 8 shows diagrams showing examples of the acceleration detected for the observation points $P_1$, $P_2$, $Q_1$ and $Q_2$ when the vehicle 6 having four axles travels on the lane $L_2$. FIG. 9 shows diagrams in which the acceleration amplitude at each time point in FIG. 8 is converted into the acceleration intensity. In the examples in FIGS. 8 and 9, since the vehicle 6 is traveling on the lane $L_2$, a large acceleration intensity is acquired at the time point when each of the four axles of the vehicle 6 passes the observation points $P_2$ and $Q_2$. The acceleration intensity acquired at the time point when each of the four axles passes the observation point $P_2$ is included in the first observation point information. The acceleration intensity acquired at the time point when each of the four axles passes the observation point $Q_2$ is included in the second observation point information.

The measurement device 1 acquires a time point when the acquired acceleration intensity exceeds a predetermined threshold value as time points when the leading axle and subsequent axles successively pass the observation points $P_2$ and $Q_2$, that is, the entry time point of each axle to the lane $L_2$ and the exit time point of each axle from the lane $L_2$.

Figure 10:
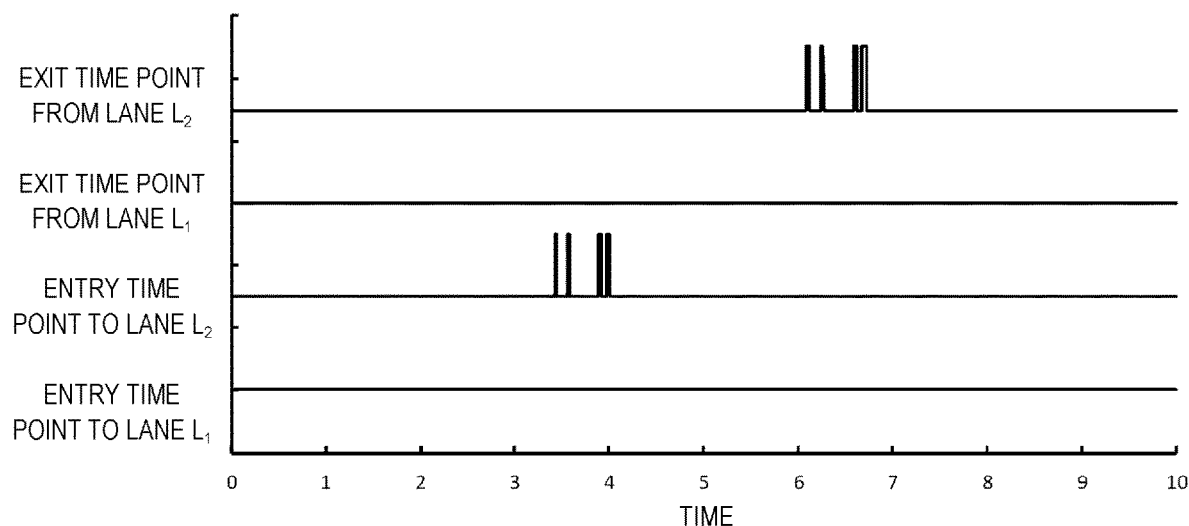
FIG. 10 is a diagram obtained by binarizing the acceleration intensity in FIG. 9 with a predetermined threshold value.

FIG. 10 is a diagram obtained by binarizing the acceleration intensities in FIG. 9 with the predetermined threshold value. In the example in FIG. 10, the entry time point of each of the four axles to the lane $L_2$ and the exit time point of each of the four axles from the lane $L_2$ are acquired. The entry time point of each of the four axles to the lane $L_2$ is included in the first observation point information. Further, the exit time of each of the four axles from the lane $L_2$ is included in the second observation point information.

Further, the measurement device 1 compares a pattern 1 of the entry time point of each of the four axles to the lane $L_2$ and a pattern 2 of the exit time point of each of the four axles from the lane $L_2$, and determines whether the two patterns are generated by the passage of the same vehicle 6. Since intervals among the four axles do not change, if the vehicle 6 travels on the superstructure 7 at a constant speed, the patterns 1 and 2 coincide with each other. For example, the measurement device 1 slides one of the time points of the patterns 1 and 2 so as to coincide the entry time point and the exit time point of the leading axle. When a difference between the entry time point and the exit time point of each of the second to fourth axles is less than or equal to a predetermined threshold value, the measurement device 1 determines that the patterns 1 and 2 are generated by the passage of the same vehicle 6. When the difference is greater than the predetermined threshold value, the measurement device 1 determines that the patterns 1 and 2 are generated by the passage of two vehicles 6. When two vehicles 6 continuously travel on one lane at the same speed, an erroneous determination that the plurality of axles of a preceding vehicle 6 and the plurality of axles of a rear vehicle 6 all belong to the axles of one vehicle 6 may occur. In order to avoid the erroneous determination, when an interval between the entry time point and the exit time point of two adjacent axles is a time difference more than or equal to a predetermined time, the measurement device 1 may distinguish that the entry time point and the exit time point of the two axles belong to two vehicles 6.

Figure 11:
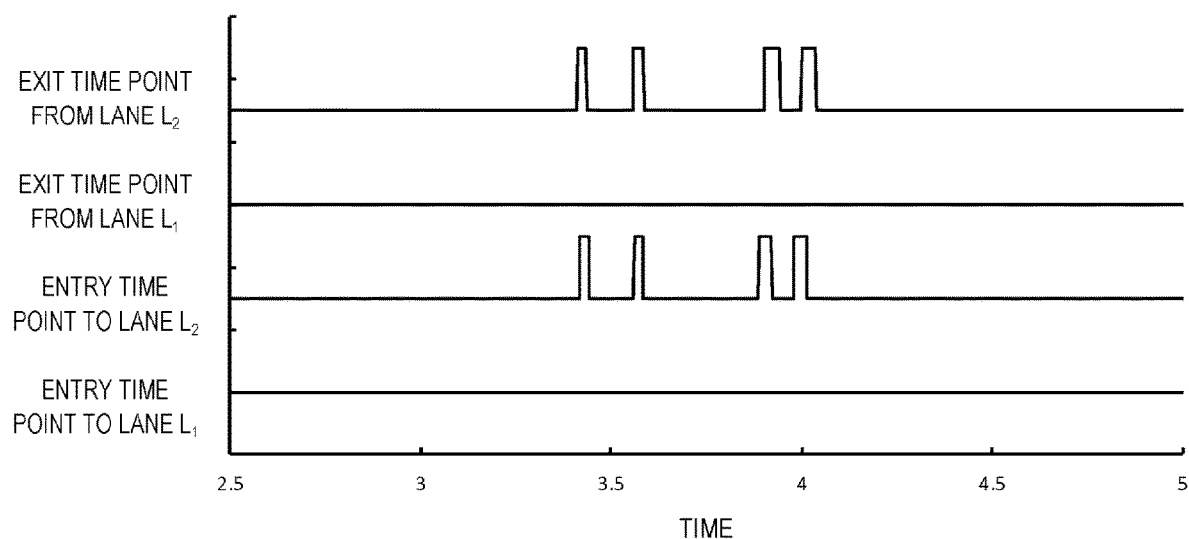
FIG. 11 is a diagram in which a pattern at an exit time point is slid with respect to FIG. 10.

FIG. 11 is a diagram in which the pattern 2 showing the exit time point from the lane $L_2$ of each of the four axles is slid so as to coincide the entry time point and the exit time point of the leading axle with respect to FIG. 10. FIG. 11 is enlarged in a horizontal axis direction with respect to FIG. 10. In the example in FIG. 11, the pattern 1 showing the entry time point of each of the four axles to the lane $L_2$ and the pattern 2 showing the exit time point of each of the four axles from the lane $L_2$ are substantially the same. It is determined that the patterns 1 and 2 are generated by the passage of the same vehicle 6.

Then, by associating the four entry time points to the lane $L_2$ shown in FIG. 10 and peak values of the four acceleration intensities at the observation point $P_2$ shown in FIG. 9, the four exit time points from the lane $L_2$ shown in FIG. 10, and peak values of the four acceleration intensities at the observation point $Q_2$ shown in FIG. 9 with one another in order from the first, the measurement device 1 acquires the correspondence information of the leading axle, the correspondence information of the second axle, the correspondence information of the third axle, and the correspondence information of the fourth axle. Further, the measurement device 1 acquires the correspondence information in which the vehicle 6 traveling on the lane $L_2$ and the correspondence information of the four axles are associated with each other. These pieces of information are included in the axle information together with the first observation point information and the second observation point information.

Based on the axle information, the measurement device 1 can identify, for any vehicle 6 passing through the lane $L_j$ of the superstructure 7, the entry time point of each axle of the vehicle 6 to the observation point $P_j$, the acceleration intensity at the observation point $P_j$ by each axle, the exit time point of each axle from the observation point Q, and the acceleration intensity at the observation point Q by each axle.

1-3. Generation of Deflection Waveform

Figure 12:
FIG. 12 is a diagram illustrating a structural model of a superstructure of a bridge.

In the present embodiment, considering that in the superstructure 7 of the bridge 5, one or more bridge floors 7a constituted by the floor plate F and the main girders $G_1$ to $G_K$ are continuously arranged, the measurement device 1 calculates a displacement of one bridge floor 7a as a displacement at a central portion in the longitudinal direction. The load applied to the superstructure 7 moves from one end to the other end of the superstructure 7. At this time, a position of the load on the superstructure 7 and a load amount can be used to express a deflection amount, which is the displacement at the central portion of the superstructure 7. In the present embodiment, in order to express, as a trajectory of a deflection amount due to the movement on a beam with a one-point load, the deflection deformation when the axles of the vehicle 6 move on the superstructure 7, a structural model shown in FIG. 12 is considered. In the structural model, the deflection amount at the central position is calculated. In FIG. 12, P is the load. a is a load position from an end of the superstructure 7 on a side where the vehicle 6 enters. b is a load position from an end of the superstructure 7 on a side where the vehicle 6 exits. l is a distance between both ends of the superstructure 7. The structural model shown in FIG. 12 is a simple beam that supports both ends with both ends as fulcrums.

In the structural model shown in FIG. 12, when the position of the end of the superstructure 7 on the side where the vehicle 6 enters is zero and the observation position for the deflection amount is x, a bending moment M of the simple beam is expressed by Equation (1).

$$M = \frac{b}{l}Px - PH_a(x - a) \quad (1)$$

In Equation (1), a function $H_a$ is defined as in Equation (2).

$$H_a = \begin{cases} 0 & (\text{if } x \leq a) \\ 1 & (\text{if } x > a) \end{cases} \quad (2)$$

Equation (3) is obtained by transforming Equation (1).

$$-\frac{Ml}{P} = -bx + H_a l(x - a) \quad (3)$$

Meanwhile, the bending moment M is expressed by Equation (4). In Equation (4), θ is an angle, I is a secondary moment, and E is a Young's modulus.

$$-M = EI\frac{d\theta}{dx} \quad (4)$$

Equation (4) is substituted into Equation (3), and Equation (5) is obtained.

$$\frac{EIl}{P}\frac{d\theta}{dx} = -bx + H_a l(x - a) \quad (5)$$

Equation (6) is obtained by integrating Equation (5) with respect to the observation position x, and Equation (7) is obtained by calculating Equation (6). In Equation (7), $C_1$ is an integral constant.

$$\int \frac{EIl}{P}\frac{d\theta}{dx}dx = \int (-bx + H_a l(x - a))dx \quad (6)$$

$$\frac{EIl}{P}\theta = -\frac{bx^2}{2} + H_a \frac{l(x - a)^2}{2} + C_1 \quad (7)$$

Further, Equation (8) is obtained by integrating Equation (7) with respect to the observation position x, and Equation (9) is obtained by calculating Equation (8). In Equation (9), $C_2$ is an integral constant.

$$\int \frac{EIl}{P}\theta dx = \int \left\{-\frac{bx^2}{2} + H_a \frac{l(x - a)^2}{2} + C_1\right\}dx \quad (8)$$

$$\frac{EIl}{P}\theta x = -\frac{bx^3}{6} + H_a \frac{l(x - a)^3}{6} + C_1 x + C_2 \quad (9)$$

In Equation (9), ex represents a deflection amount. Equation (10) is obtained by replacing θx with a deflection amount w.

$$\frac{EIl}{P}w = -\frac{bx^3}{6} + H_a \frac{l(x - a)^3}{6} + C_1 x + C_2 \quad (10)$$

Based on FIG. 12, since b=l−a, Equation (10) is transformed as Equation (11).

$$\frac{EIl}{P}w = -\frac{(l - a)x^3}{6} + H_a \frac{l(x - a)^3}{6} + C_1 x + C_2 \quad (11)$$

Since the deflection amount w=0 when x=0, and $H_a$=0 based on x≤a, Equation (12) is obtained by substituting x=w=$H_a$=0 into Equation (11).

$$C_2 = 0 \quad (12)$$

Since the deflection amount w=0 when x=1, and $H_a$=1 based on x>a, Equation (13) is obtained by substituting x=1, w=0, and $H_a$=1 into Equation (11).

$$C_1 = \frac{a(l - a)(a + 2(l - a))}{6} \quad (13)$$

Equation (14) is obtained by substituting b=l−a into Equation (13).

$$C_1 = \frac{ab(a + 2b)}{6} \quad (14)$$

Equation (15) is obtained by substituting the integral constant $C_1$ in Equation (12) and the integral constant $C_2$ in Equation (13) into Equation (10).

$$\frac{EIl}{P}w = -\frac{bx^3}{6} + H_a \frac{l(x - a)^3}{6} + \frac{ab(a + 2b)}{6}x \quad (15)$$

Equation (15) is transformed and the deflection amount w at the observation position x when the load P is applied to the position a is expressed by Equation (16).

$$w = \frac{P}{6EIl}\left\{-bx^3 + H_a l(x - a)^3 + ab(a + 2b)x\right\} \quad (16)$$

Figure 13:
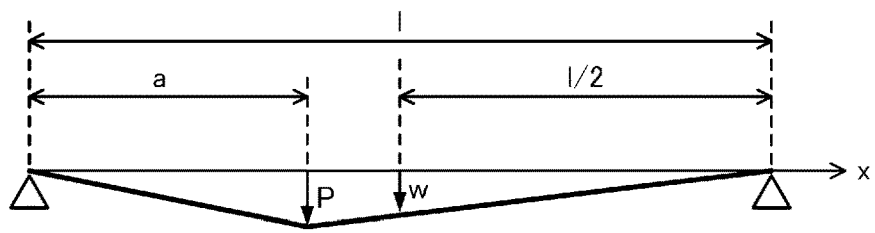
FIG. 13 is a diagram illustrating the structural model of the superstructure of the bridge.

FIG. 13 shows a state in which the load P moves from one end to the other end of the simple beam under a condition that the observation position x of the deflection amount is fixed at the central position of the simple beam, that is, when x=l/2.

When the load position a is on the left side of the observation position x=l/2, since $H_a$=1 based on x>a, Equation (17) is obtained by substituting x=l/2 and $H_a$=1 into Equation (16).

$$w = \frac{P}{6EIl}\left\{-b\left(\frac{l}{2}\right)^3 + l\left(\left(\frac{l}{2}\right) - a\right)^3 + ab(a + 2b)\left(\frac{l}{2}\right)\right\} \quad (17)$$

Equation (18) is obtained by substituting l=a+b into Equation (17).

$$w = \frac{P}{48EI}a\left(-a^2 + 3((a + b)^2 - a^2)\right) \quad (18)$$

Substituting a+b=l into Equation (18), a deflection amount $w_L$ at the observation position x when the position of the load P is on the left side of the central observation position x=l/2 is as shown in Equation (19).

$$w_L = \frac{P}{48EI}(3al^2 - 4a^3) \quad (19)$$

On the other hand, when the load position a is on the right side of the observation position x=l/2, since $H_a=0$ based on x≤a, Equation (20) is obtained by substituting x=l/2 and $H_a=0$ into Equation (16).

$$w = \frac{P}{6EIl}\left\{-b\left(\frac{l}{2}\right)^3 + ab(a+2b)\left(\frac{l}{2}\right)\right\} \quad (20)$$

Substituting l=a+b into Equation (20), a deflection amount $w_R$ at the observation position x when the position of the load P is on the right side of the central observation position x=l/2 is as shown in Equation (21).

$$w_R = \frac{P}{48EI}\{3a^2b + 6ab^2 - b^3\} \quad (21)$$

When the load position a is the same as the observation position x=l/2, since $H_a=0$ based on x≤a, Equation (22) is obtained by substituting $H_a=0$ and a=b=l/2 into Equation (16).

$$w = \frac{P}{6EIl}2a^4 \quad (22)$$

Further, substituting a=l/2 into Equation (22), the deflection amount w at the observation position x when the position of the load P is the same as the central observation position is as shown in Equation (23).

$$w = \frac{P}{48EI}l^3 \quad (23)$$

In the simple beam with the fulcrums at both ends, a maximum deflection displacement is obtained when the load P is at the center. Therefore, according to Equation (23), a maximum deflection amount $w_{max}$ is expressed by Equation (24).

$$w_{max} = w = \frac{P}{48EI}l^3 \quad (24)$$

When the deflection amount $w_L$ at the observation position x when the position of the load P is on the left side of the central observation position x=l/2 is divided by the maximum deflection amount $w_{max}$ and normalized by the maximum deflection amount $w_{max}$, Equation (25) is obtained based on Equation (19) and Equation (24).

$$\frac{w_L}{w_{max}} = \frac{\frac{P}{48EI}(3al^2 - 4a^3)}{\frac{P}{48EI}l^3} = \frac{3a}{l} - \frac{4a^3}{l^3} \quad (25)$$

Equation (26) is obtained by setting a/l=r in Equation (25).

$$\frac{w_L}{w_{max}} = 3r - 4r^3 \quad (26)$$

On the other hand, when the deflection amount $w_R$ at the observation position x when the position of the load P is on the right side of the central observation position x=l/2 is divided by the maximum deflection amount $w_{max}$ and normalized by the maximum deflection amount $w_{max}$, Equation (27) is obtained based on Equation (21) and Equation (24).

$$\frac{w_R}{w_{max}} = \frac{\frac{P}{48EI}(3a^2b + 6ab^2 - b^3)}{\frac{P}{48EI}l^3} = \frac{3b}{l} - \frac{4b^3}{l^3} \quad (27)$$

Here, since b=l×(1−r) based on a/l=r and a+b=l, Equation (28) is obtained by substituting b=l×(1−r) into Equation (27).

$$\frac{w_R}{w_{max}} = 3(1-r) - 4(1-r)^3 \quad (28)$$

By summarizing Equation (25) and Equation (27), a normalized deflection amount $w_{std}$ normalized by the maximum deflection amount observed at the central portion when the load P moves on the simple beam is expressed by Equation (29).

$$w_{std} = \frac{w}{w_{max}} = \begin{cases} 3r - 4r^3 & \left(\text{if } a < \frac{l}{2}\right) \\ 3(1-r) - 4(1-r)^3 & \left(\text{if } \frac{l}{2} < a\right) \end{cases} \quad (29)$$

In Equation (29), r=a/l and 1−r=b/l indicate a ratio of the position of the load P to the distance l between the fulcrums of the simple beam, and a variable R is defined as shown in Equation (30).

$$R = \begin{cases} \frac{a}{l} & \left(\text{if } a < \frac{l}{2}\right) \\ \frac{b}{l} & \left(\text{if } \frac{l}{2} < a\right) \end{cases} \quad (30)$$

Equation (29) is replaced by Equation (31) using Equation (30).

$$w_{std} = 3R - 4R^3 \quad (31)$$

Equation (30) and Equation (31) indicate that, when the observation position is at the center of the simple beam, the deflection amount is symmetrical on the right side and the left side of the center of the position of the load P.

Figure 14:
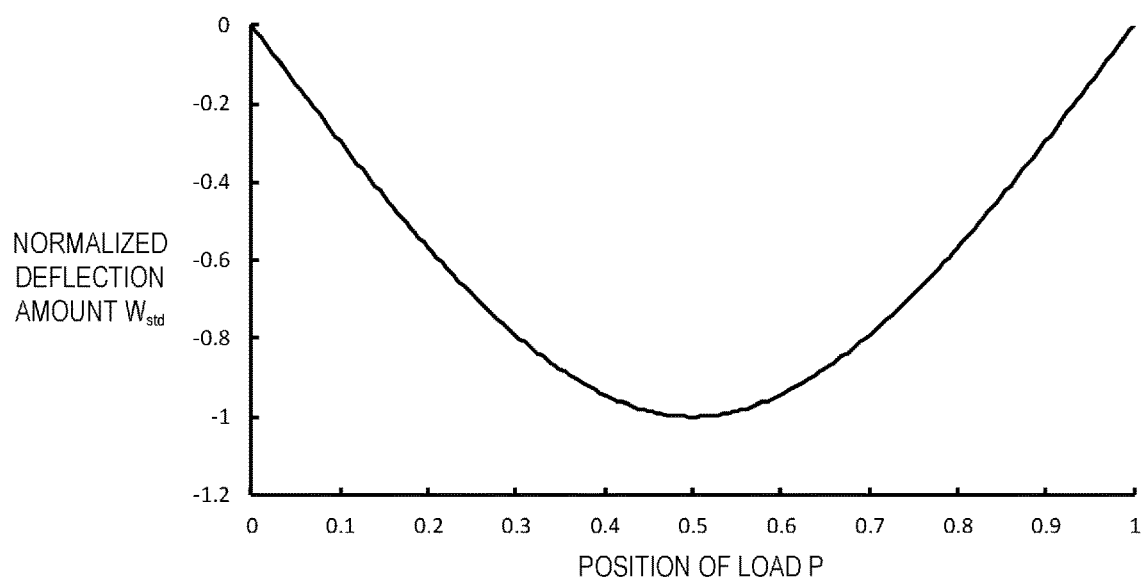
FIG. 14 shows an example of a normalized deflection amount waveform.

FIG. 14 shows an example of a waveform of the normalized deflection amount $w_{std}$ in the case of the observation position x=l/2. In FIG. 14, the horizontal axis represents the position of the load P, and the vertical axis represents the normalized deflection amount $w_{std}$. In the example in FIG. 14, the distance l between the fulcrums of the simple beam is 1.

The above-described axle information includes the entry time point of each axle of the vehicle 6 to the lane $L_j$ and the exit time point of each axle of the vehicle 6 from the lane $L_j$, that is, the time points when the vehicle 6 passes the positions at both ends of the superstructure 7. Therefore, the positions at both ends of the superstructure 7 correspond to the entry time point and the exit time point of the axle, and the load positions a and b are replaced with time. It is assumed that the speed of the vehicle 6 is substantially constant and the position and the time point are substantially proportional.

When the load position at the left end of the superstructure 7 corresponds to an entry time point $t_i$, and the load position at the right end of the superstructure 7 corresponds to an exit time point $t_o$, the load position a from the left end is replaced with an elapsed time point $t_p$ from the entry time point $t_i$. The elapsed time point $t_p$ is expressed by Equation (32).

$$t_p = t - t_i \tag{32}$$

The distance l between the fulcrums is replaced by a time $t_s$ from the entry time point $t_i$ to the exit time point $t_o$. The time $t_s$ is expressed by Equation (33).

$$t_s = t_o - t_i \tag{33}$$

Since the speed of the vehicle 6 is constant, a time point $t_c$ when the load position a is at the center of the superstructure 7 is expressed by Equation (34).

$$t_c = \frac{t_i + t_o}{2} \tag{34}$$

By replacing the position with the time as described above, the position of the load P is expressed by Equation (35) and Equation (36).

$$\frac{a}{l} = r = \frac{t_p}{t_s} \tag{35}$$

$$1 - r = 1 - \frac{t_p}{t_s} \tag{36}$$

Substituting Equation (35) and Equation (36) into Equation (29), the normalized deflection amount $w_{std}$ replaced by time is expressed by Equation (37).

$$w_{std} = \begin{cases} 0 \text{ (if } t < t_i) \\ 3\frac{t_p}{t_s} - 4\left(\frac{t_p}{t_s}\right)^3 \left(\text{if } t_i < t < \frac{(t_o + t_i)}{2}\right) \\ 3\left(1 - \frac{t_p}{t_s}\right) - 4\left(1 - \frac{t_p}{t_s}\right)^3 \left(\text{if } \frac{(t_o + t_i)}{2} < t < t_o\right) \\ 0 \text{ (if } t > t_o) \end{cases} \tag{37}$$

Alternatively, according to Equation (30) and Equation (31), the normalized deflection amount $w_{std}$ normalized by the maximum amplitude is expressed by Equation (38) by substituting the variable R with time.

$$w_{std} = 3R - 4R^3, R = \begin{cases} 0 \text{ (if } t < t_i) \\ \frac{t_p}{t_s} \left(\text{if } t_i < t < \frac{(t_o + t_i)}{2}\right) \\ 1 - \frac{t_p}{t_s} \left(\text{if } \frac{(t_o + t_i)}{2} < t < t_o\right) \\ 0 \text{ (if } t > t_o) \end{cases} \tag{38}$$

Considering that a relationship between the elapse of time and the normalized deflection amount is treated as observation data, the normalized deflection amount $w_{std}$ is replaced with a normalized deflection amount model $w_{std}(t)$ at the observation position at the center of the beam due to the movement of a single concentrated load on the simple beam with the fulcrums at both ends, and Equation (38) becomes Equation (39). Equation (39) is an approximate expression of deflection of the superstructure 7, which is a structure, and is an expression based on the structure model of the superstructure 7. Specifically, Equation (39) is an expression normalized by the maximum amplitude of deflection at the central position between the observation point $P_j$ and the observation point $Q_j$ in the lane $L_j$ where the vehicle 6 moves. The maximum value of the equation is 1.

$$w_{std}(t) = 3R - 4R^3, R = \begin{cases} 0 \text{ (if } t < t_i) \\ \frac{t_p}{t_s} \left(\text{if } t_i < t < \frac{(t_o + t_i)}{2}\right) \\ 1 - \frac{t_p}{t_s} \left(\text{if } \frac{(t_o + t_i)}{2} < t < t_o\right) \\ 0 \text{ (if } t > t_o) \end{cases} \tag{39}$$

Time information required for the normalized deflection amount model $w_{std}(t)$ is obtained from the axle information described above. Since the normalized deflection amount model $w_{std}(t)$ has a maximum deflection amount $w_{max}$ at the central position of the superstructure 7, Equation (40) is obtained.

$$w_{max} = \max\{w_{std}(t)\} = w_{std}\left(t_i + \frac{1}{2}t_s\right) \tag{40}$$

Since the deflection amount w shown in the above Equation (23) is the deflection amount at the observation position x=l/2 when the position of the load P is the same as the central observation position, and the deflection amount w coincides with the maximum deflection amount $w_{max}$, Equation (41) is obtained.

$$w_{max} = \frac{P}{48EI}l^3 \tag{41}$$

Figure 15:
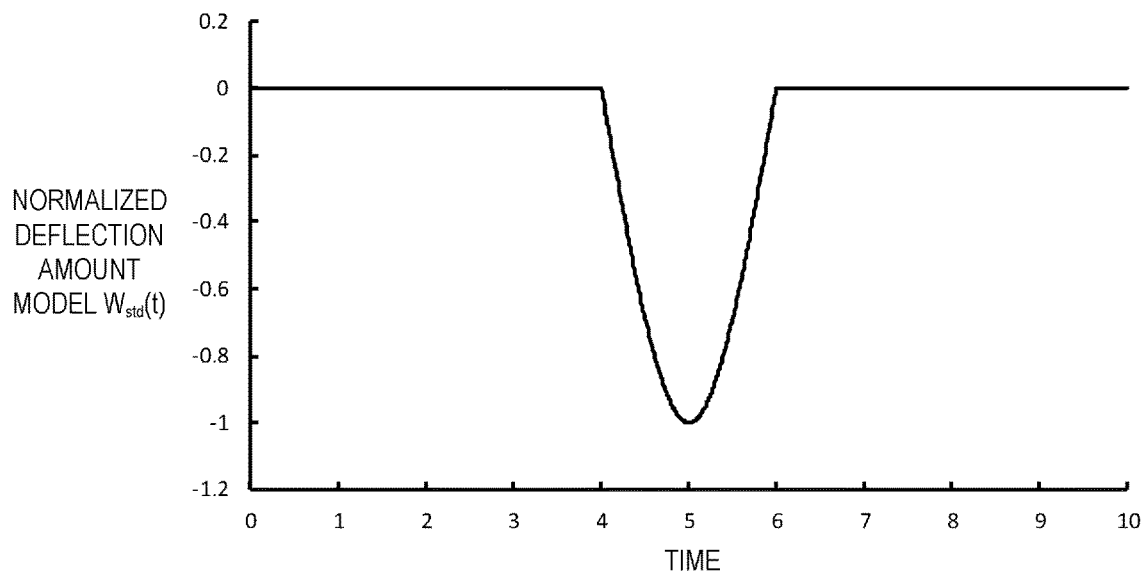
FIG. 15 is a diagram showing an example of the normalized deflection amount model.

FIG. 15 shows an example of the normalized deflection amount model $w_{std}(t)$. In the example in FIG. 15, at the time point $t_c=(t_i+t_o)=5$ in which the entry time point $t_i=4$ and the exit time point $t_o=6$, the normalized deflection amount model $w_{std}(t)$ has the maximum deflection amount $w_{max}=1$ at the central position of the superstructure 7.

It is assumed that the superstructure 7 which is the structure functions as bridge weigh in motion (BWIM), and is considered to be deformed in a manner of resembling a simple beam with both ends as fulcrums. Since the vehicle 6, which is a moving object, passes through the superstructure 7 substantially at a constant speed from one end portion and moves to the other end portion of the superstructure 7, an intermediate portion of the superstructure 7 and the end portion of the superstructure 7 receive the same load. Therefore, it can be considered that the observed displacement of the superstructure 7 is approximately proportional to an acceleration intensity $a_p$ of the axle obtained from the axle information.

Assuming that a proportional coefficient is a product of the acceleration intensity $a_p$ of the axle obtained from the axle information and a predetermined coefficient p, a deflection waveform H(t) of the superstructure 7 generated by each axle is obtained by Equation (42). The acceleration intensity $a_p$ may be the acceleration intensity at the time of entry and the acceleration intensity at the time of exit, which are included in the axle information, or a statistical value such as an average value of the acceleration intensity at the time of entry and the acceleration intensity at the time of exit.

$$H(t) = pa_p w_{std}(t) \quad (42)$$

Substituting Equation (39) into Equation (42), the deflection waveform H(t) is expressed by Equation (43).

$$H(t) = pa_p(3R - 4R^3), R = \begin{cases} 0 \text{ (if } t < t_i) \\ \frac{t_p}{t_s}\left(\text{if } t_i < t < \frac{(t_O + t_i)}{2}\right) \\ 1 - \frac{t_p}{t_s}\left(\text{if } \frac{(t_O + t_i)}{2} < t < t_o\right) \\ 0 \text{ (if } t > t_o) \end{cases} \quad (43)$$

Until now, the single load $P_j$ is applied to the superstructure 7. However, since the load from each axle of the vehicle 6 is applied to the lane $L_j$ on which the vehicle 6 travels, Equation (43) is replaced by a deflection waveform $H_{jk}(t)$ as in Equation (44). In Equation (44), k is an integer indicating the axle number, and j is an integer indicating the lane number. As shown in Equation (44), the deflection waveform $H_{jk}(t)$ is proportional to the product of the predetermined coefficient p and an acceleration intensity $a_{pjk}$.

$$H_{jk}(t) = pa_{p_{jk}} w_{std}(t) = pa_{p_{jk}}(3R - 4R^3), \quad (44)$$

$$R = \begin{cases} 0 \text{ (if } t < t_i) \\ \frac{t_p}{t_s}\left(\text{if } t_i < t < \frac{(t_O + t_i)}{2}\right) \\ 1 - \frac{t_p}{t_s}\left(\text{if } \frac{(t_O + t_i)}{2} < t < t_o\right) \\ 0 \text{ (if } t > t_o) \end{cases}$$

Figure 16:
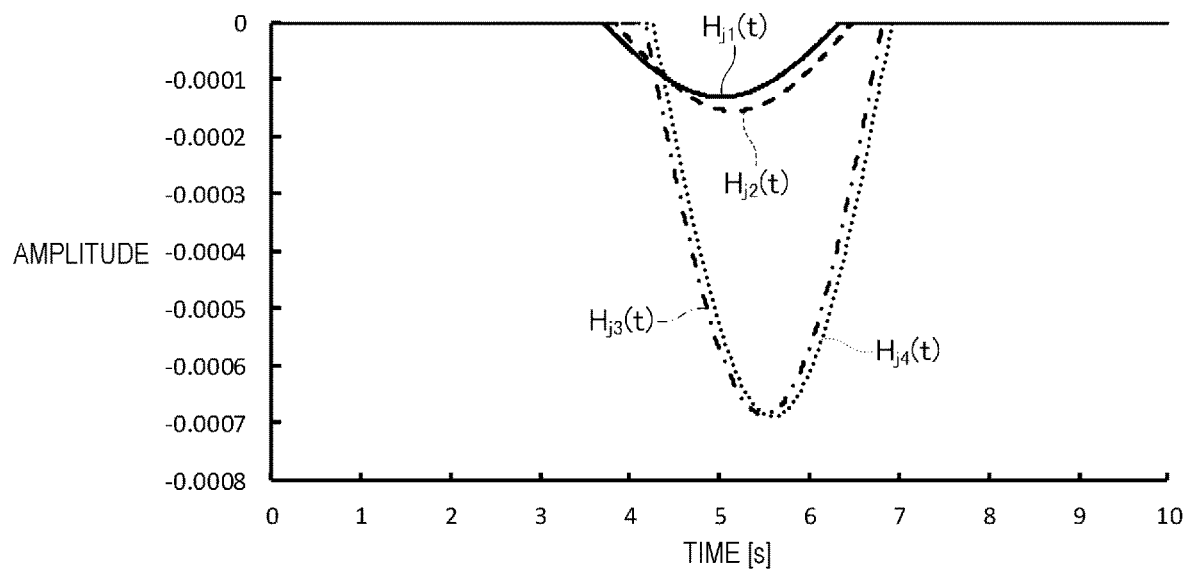
FIG. 16 is a diagram showing an example of a deflection waveform of the bridge generated by each axle.

FIG. 16 shows an example of the deflection waveform of the superstructure 7 generated by each axle included in the vehicle 6 traveling on the lane $L_j$. In the example in FIG. 16, the vehicle 6 is a four-axle vehicle, and four deflection waveforms $H_{j1}(t)$, $H_{j2}(t)$, $H_{j3}(t)$, and $H_{j4}(t)$ are shown. In the example in FIG. 16, since the loads generated by the leading and second axles are relatively small and the loads generated by the third and fourth axles are relatively large, maximum amplitudes of the deflection waveforms $H_{j1}(t)$ and $H_{j2}(t)$ are relatively small, and maximum amplitudes of the deflection waveforms $H_{j3}(t)$ and $H_{j4}(t)$ are relatively large.

As shown in Equation (45), a deflection waveform $CP_{Bjm}(t)$ of the superstructure 7 generated by the vehicle 6 traveling on the lane $L_j$ is obtained by adding the deflection waveform $H_{jk}(t)$ of the superstructure 7 generated by each axle. In Equation (45), m is an integer indicating the vehicle number, k is an integer indicating the axle number, and j is an integer indicating the lane number.

$$CP_{jm}(t) = \sum_k H_{jk}(t) \quad (45)$$

Figure 17:
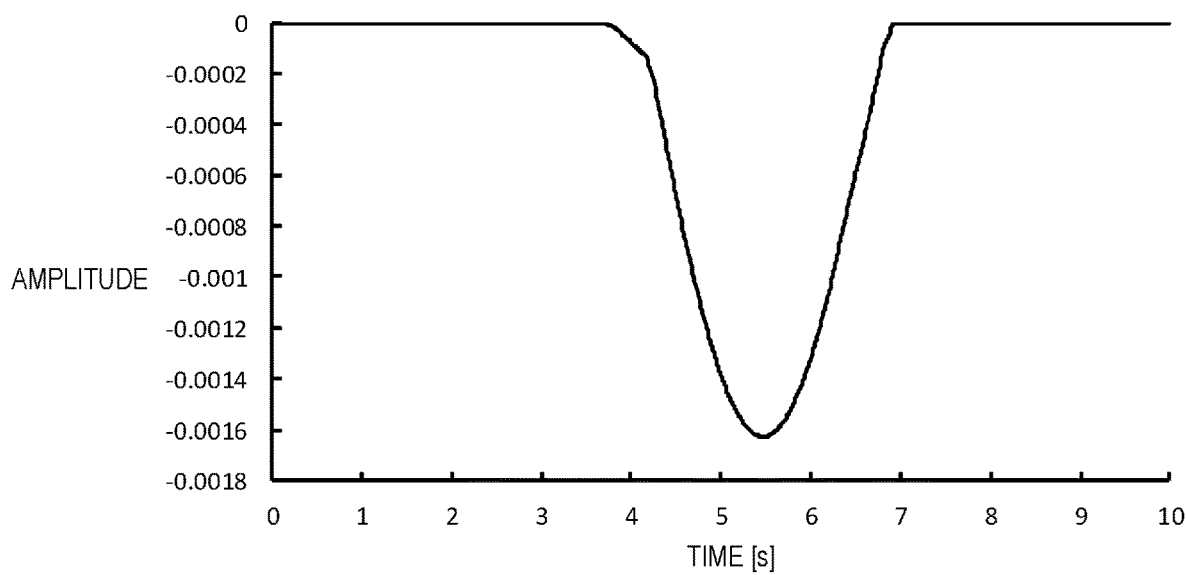
FIG. 17 is a diagram showing an example of a deflection waveform of the bridge generated by a vehicle.

FIG. 17 shows a deflection waveform $CP_{jm}(t)$ of the superstructure 7 generated by the vehicle 6 whose vehicle number is m, which is obtained by adding the four deflection waveforms $H_{j1}(t)$, $H_{j2}(t)$, $H_{j3}(t)$, and $H_{j4}(t)$ shown in FIG. 16.

1-4. Calculation of Displacement

The correlation between the deflection waveform $CP_{jm}(t)$ shown in Equation (45) and an observed displacement CU(t) is approximated by a polynomial equation. For example, as in Equation (46), the displacement CU(t) is approximated by a linear equation of the deflection waveform $CP_{jm}(t)$. In Equation (46), s is a first-order coefficient, and i is a zero-order coefficient.

$$CU(t) \cong sCP_{jm}(t) + i \quad (46)$$

The first-order coefficient s and the zero-order coefficient i are calculated by, for example, a load test performed on a plurality of vehicles. For example, a displacement meter is installed at the center of the lane L and each of the plurality of vehicles independently travels on the lane $L_j$. The measurement device 1 generates the axle information and acquires the displacement measured by the displacement meter. Then, the measurement device 1 plots the maximum value of the measured displacement as $CU_{max}$ and the maximum value of the deflection waveform $CP_{jm}(t)$ obtained according to Equation (45) and from the axle information as $CP_{jm\text{-}max}$ on a graph, and obtains a first-order coefficient $s_{cu}$ and a zero-order coefficient $i_{cu}$ of an approximate straight line.

Figure 18:
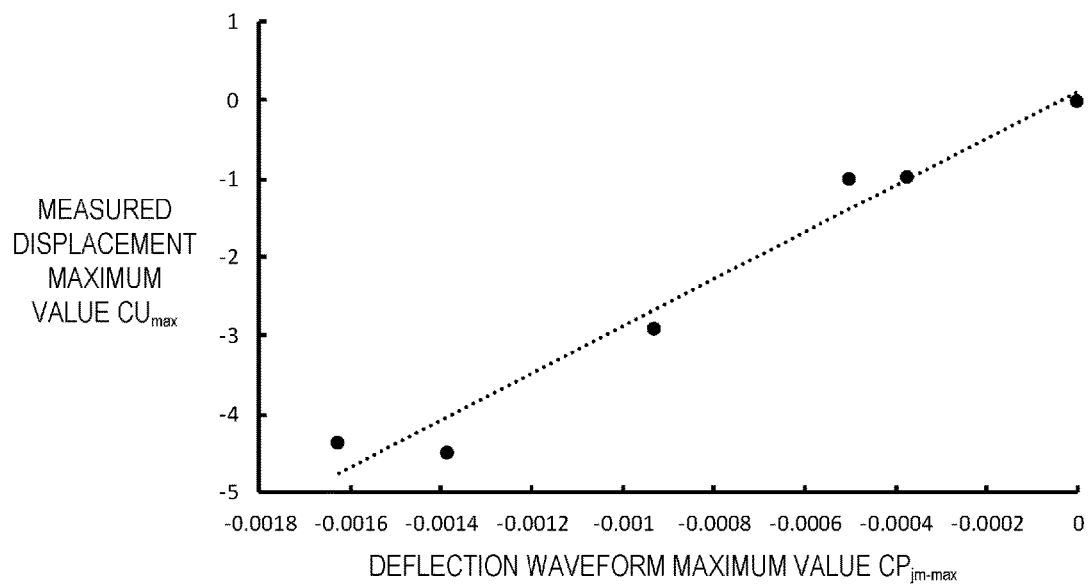
FIG. 18 is a diagram obtained by plotting a result of a load test.

FIG. 18 is a diagram obtained by plotting the results of the load test performed on six vehicles. In FIG. 18, the horizontal axis represents the maximum value $CP_{jm\text{-}max}$ of the deflection waveform of the superstructure 7 generated by the vehicle, and the vertical axis represents the maximum value $CU_{max}$ of the measured displacement. In FIG. 18, the six points are arranged in a straight line, and an approximate straight line with respect to the six points is indicated by a dotted line. In the example in FIG. 18, in the approximate straight line, the first-order coefficient $s_{cu}$ is 3084.435944, and the zero-order coefficient $i_{cu}$ is 0.229180174.

The measurement device 1 calculates a displacement $CU_{est}(t)$ at the center of the lane $L_j$ according to Equation (47) and using the first-order coefficient $s_{cu}$, the zero-order coefficient $i_{cu}$, and the deflection waveform CP (t) obtained according to Equation (45) from axle information of an unknown vehicle 6.

$$CU_{est}(t) = s_{cu} CP_{jm}(t) + i_{cu} \quad (47)$$

Figure 19:
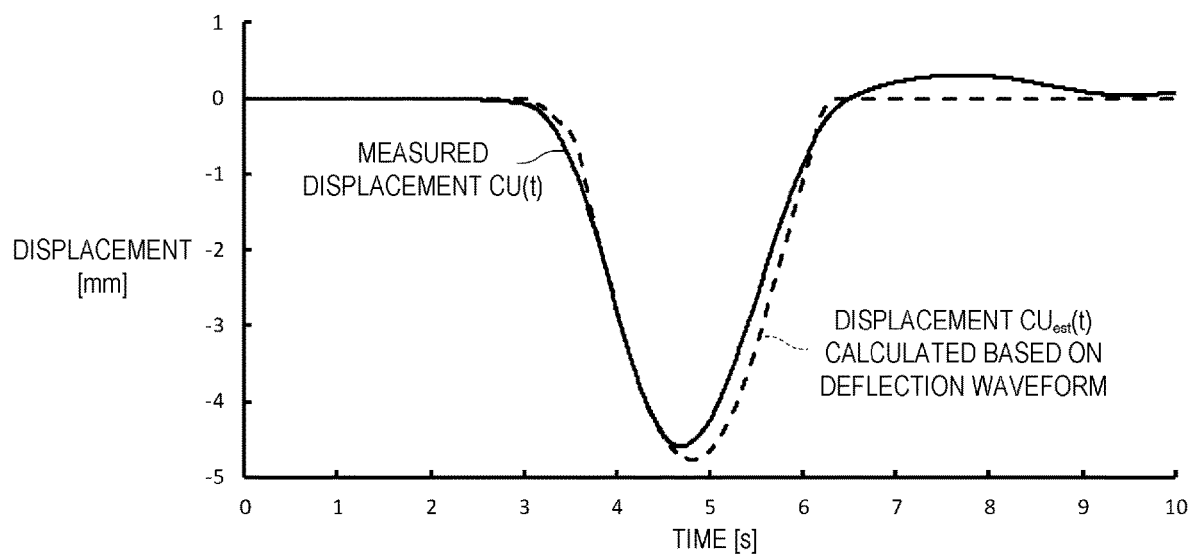
FIG. 19 is a diagram showing an example of a measured displacement and a displacement calculated based on the deflection waveform.

FIG. 19 shows an example of the measured displacement CU(t) and the displacement $CU_{est}(t)$ calculated based on the deflection waveform $CP_{jm}(t)$. In FIG. 19, the solid line indicates the measured displacement CU(t), and the broken line indicates the displacement $CU_{est}(t)$ calculated based on the deflection waveform $CP_{jm}(t)$. As shown in FIG. 19, the displacement $CU_{est}(t)$ calculated based on the deflection waveform $CP_{jm}(t)$ approximates the measured displacement CU(t). Therefore, according to Equation (47), the measurement device 1 can calculate the displacement at the center generated by an unknown vehicle 6 traveling on the lane $L_j$ without measuring the displacement at the center of the lane $L_j$.

In Equation (47), the zero-order coefficient $i_{cu}$ is a small value. By substituting $i_{cu}=0$ into Equation (47), Equation (48) is obtained based on Equation (44) and Equation (45).

$$CU_{est}(t) = s_{cu}CP_{jm}(t) = s_{cu}\sum_k pa_{p_{jk}} w_{std}(t) = p\sum_k s_{cu}a_{p_{jk}}(3R - 4R^3) \quad (48)$$

According to Equation (48), since the predetermined coefficient p and the first-order coefficient $s_{cu}$ can be exchanged, the predetermined coefficient p is a coefficient having the same function as the first-order coefficient $s_{cu}$. That is, the predetermined coefficient p is a coefficient of a function that approximates a correlation between a deflection of a portion of the superstructure 7 and a displacement of the portion of the superstructure 7 between the observation point $P_j$ and the observation point $Q_1$.

1-5. Measurement Method

Figure 20:
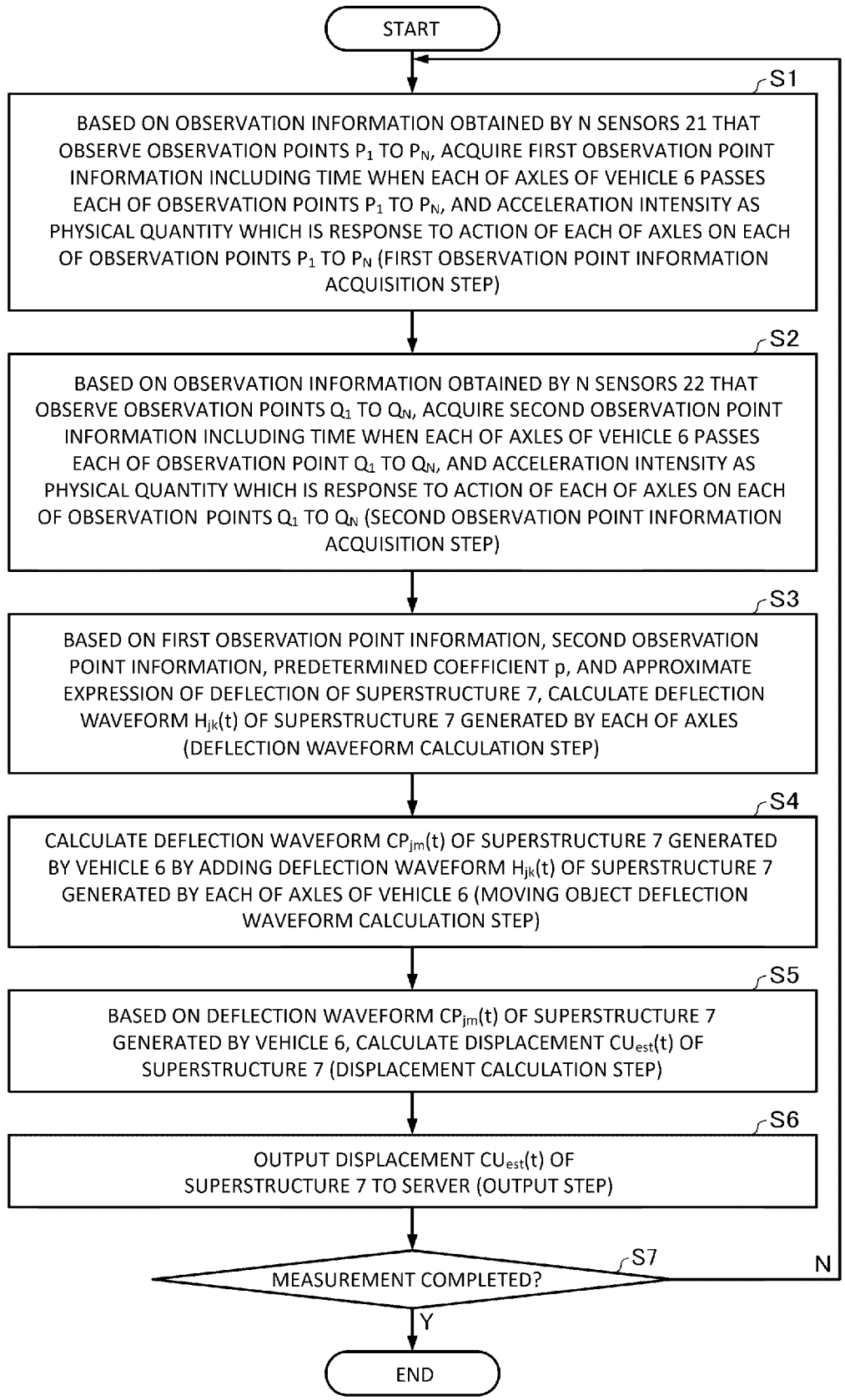
FIG. 20 is a flowchart showing an example of a procedure of a measurement method according to a first embodiment.

FIG. 20 is a flowchart showing an example of a procedure of the measurement method according to the first embodiment. In the present embodiment, the measurement device 1 executes the procedure shown in FIG. 20.

As shown in FIG. 20, first, based on the observation information obtained by the N sensors 21 that observe the observation points $P_1$ to $P_N$, the measurement device 1 acquires the first observation point information including the time point when each of the plurality of axles of the vehicle 6 passes each of the observation points $P_1$ to $P_N$, and the acceleration intensity as the physical quantity which is the response to the action of each of the plurality of axles on each of the observation points $P_1$ to $P_N$ (step S1). As described above, the N sensors 21 are acceleration sensors. The observation information obtained by the N sensors 21 is detection information on the acceleration generated at the observation points $P_1$ to $P_N$. The measurement device 1 acquires the first observation point information based on the acceleration detected by each of the N sensors 21. The step S1 is a first observation point information acquisition step.

Next, based on the observation information obtained by the N sensors 22 that observe the observation points $Q_1$ to $Q_N$, the measurement device 1 acquires the second observation point information including the time point when each of the plurality of axles of the vehicle 6 passes each of the observation points $Q_1$ to $Q_N$, and the acceleration intensity as the physical quantity which is the response to the action of each of the plurality of axles on each of the observation points $Q_1$ to $Q_N$ (step S2). As described above, the N sensors 22 are acceleration sensors. The observation information obtained by the N sensors 22 is detection information on the acceleration generated at the observation points $Q_1$ to $Q_N$. The measurement device 1 acquires the second observation point information based on the acceleration detected by each of the N sensors 22. The step S2 is a second observation point information acquisition step.

Next, based on the first observation point information acquired in step S1, the second observation point information acquired in step S2, the predetermined coefficient p, and the approximate expression of deflection of the superstructure 7, the measurement device 1 calculates the deflection waveform $H_{jk}(t)$ of the superstructure 7 generated by each of the plurality of axles (step S3). Specifically, the measurement device 1 generates the above-described axle information using the first observation point information and the second observation point information, and calculates the deflection waveform $H_{jk}(t)$ of the superstructure 7 generated by each axle of the vehicle 6 traveling on each lane $L_j$ according to the above Equation (44) and using the axle information and the predetermined coefficient p. The step S3 is a deflection waveform calculation step.

Next, according to the above-described Equation (45), the measurement device 1 calculates the deflection waveform $CP_{jm}(t)$ of the superstructure 7 generated by the vehicle 6 by adding the deflection waveform H k (t) of the superstructure 7 generated by each of the plurality of axles of the vehicle 6 and calculated in step S3 (step S4). The step S4 is a moving object deflection waveform calculation step.

Next, based on the deflection waveform CP (t) of the superstructure 7 generated by the vehicle 6 calculated in step S4, the measurement device 1 calculates the displacement $CU_{est}(t)$ of the superstructure 7 according to the above Equation (47) (step S5). The step S5 is a displacement calculation step.

Next, the measurement device 1 outputs the displacement $CU_{est}(t)$ of the superstructure 7 calculated in step S5 to the server 2 (step S6). The step S6 is an output step.

The measurement device 1 repeats the processing in steps S1 to S6 until the measurement is completed (N in step S7).

Figure 21:
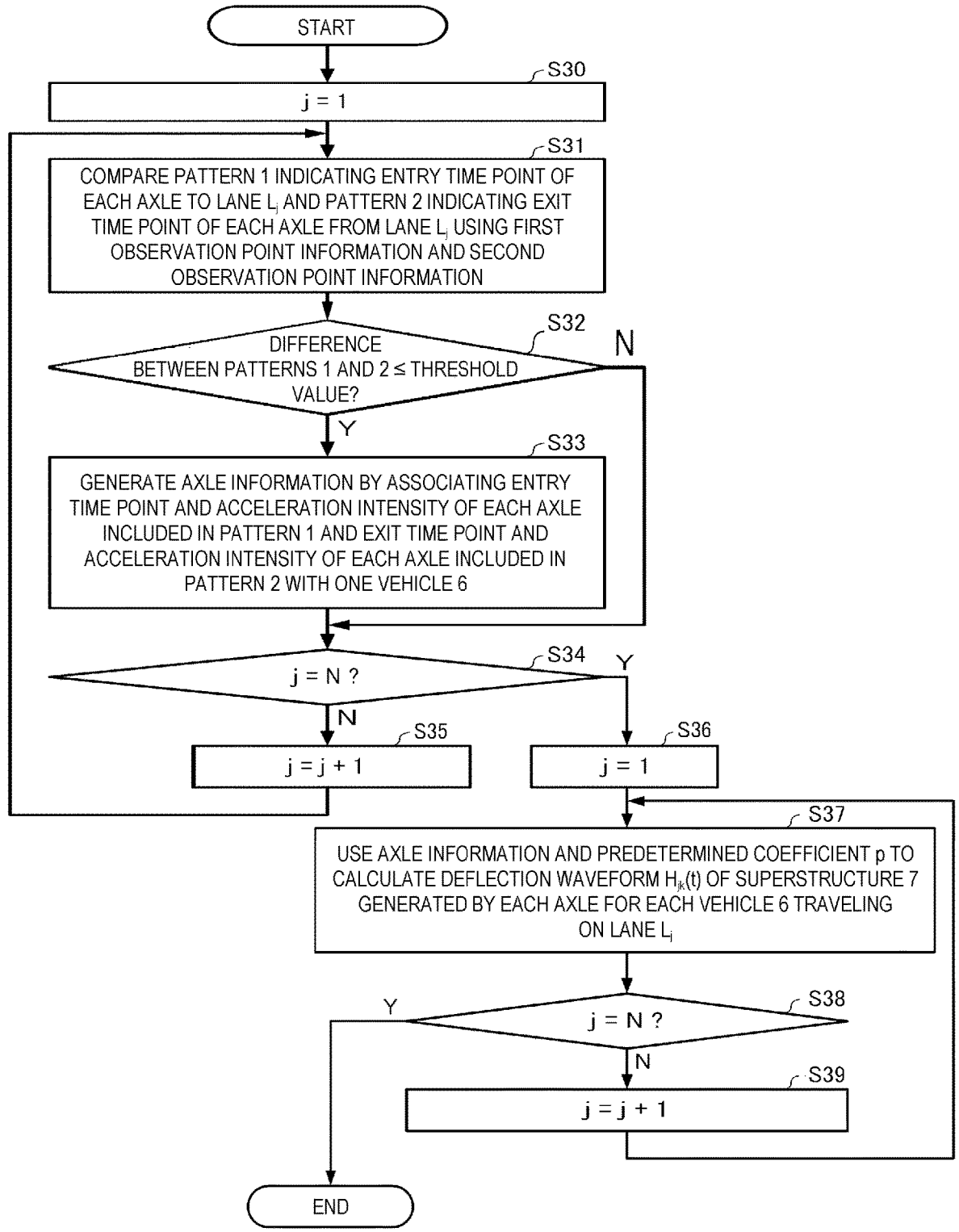
FIG. 21 is a flowchart showing an example of a procedure of a deflection waveform calculation step.

FIG. 21 is a flowchart showing an example of a procedure of the deflection waveform calculation step, which is step S3 in FIG. 20.

As shown in FIG. 21, first, the measurement device 1 sets the integer j to 1 (step S30), and compares the pattern 1 indicating the entry time point of each axle to the lane $L_j$ and the pattern 2 indicating the exit time point of each axle from the lane $L_j$ using the first observation point information and the second observation point information (step S31).

Then, when a difference between the entry time point of each axle included in the pattern 1 and the exit time point of each axle included in the pattern 2 is less than or equal to a threshold value (Y in step S32), the measurement device 1 generates the axle information by associating the entry time point and the acceleration intensity of each axle included in the pattern 1 and the exit time point and the acceleration intensity of each axle included in the pattern 2 with one vehicle 6 (step S33).

When the difference between the entry time point of each axle included in the pattern 1 and the exit time of each axle included in the pattern 2 is greater than the threshold value (N in step S32), the measurement device 1 does not perform the processing in step S33.

When the integer j is not N (N in step S34), the measurement device 1 adds 1 to the integer j (step S35), and repeats the processing in steps S31 to S33.

Then, when the integer j is N (Y in step S34), the measurement device 1 sets the integer j to 1 (step S36). The measurement device 1 calculates, using the axle information generated in step S33 and the predetermined coefficient p, the deflection waveform $H_{jk}(t)$ of the superstructure 7 generated by each axle for each vehicle 6 traveling on the lane $L_j$ (step S37).

When the integer j is not N (N in step S38), the measurement device 1 adds 1 to the integer j (step S39), and repeats the processing in step S37.

Then, when the integer j is N (Y in step S38), the measurement device 1 ends the processing in the deflection waveform calculation step.

1-6. Configuration of Measurement Device

Figure 22:
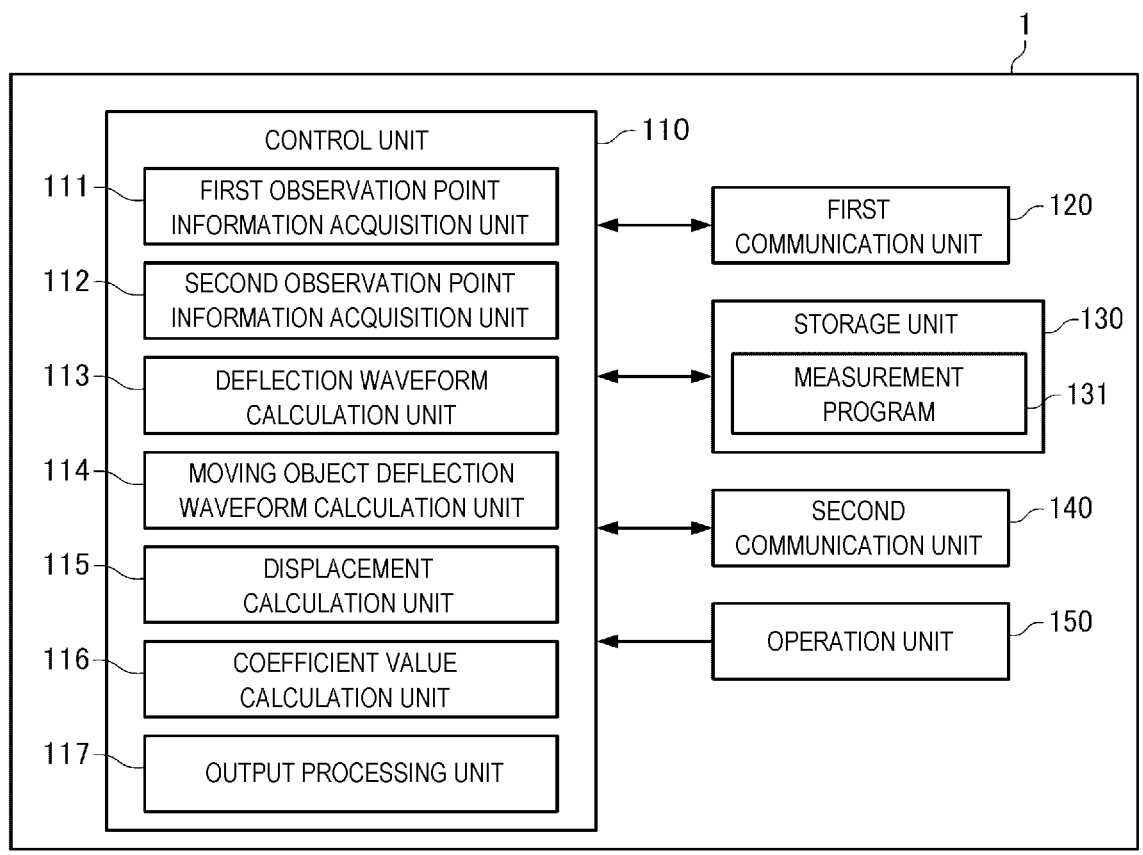
FIG. 22 is a diagram showing a configuration example of a measurement device according to the first embodiment.

FIG. 22 is a diagram showing a configuration example of the measurement device 1 according to the first embodiment. As shown in FIG. 22, the measurement device 1 includes a control unit 110, a first communication unit 120, a storage unit 130, a second communication unit 140, and an operation unit 150.

The control unit 110 calculates the time point when the vehicle 6 travels on the superstructure 7 or the displacement or the like of the superstructure 7 based on the acceleration data output from each of the sensors 21 and 22 installed in the superstructure 7.

The first communication unit 120 receives the acceleration data from each of the sensors 21 and 22. The acceleration data output from each of the sensors 21 and 22 is, for example, a digital signal. The first communication unit 120 outputs to the control unit 110 the acceleration data received from each of the sensors 21 and 22.

The storage unit 130 is a memory that stores a program, data, and the like for the control unit 110 to perform calculation processing and control processing. In addition, the storage unit 130 stores a program, data, and the like for the control unit 110 to implement a predetermined application function. The storage unit 130 is implemented by, for example, various integrated circuit (IC) memories such as a read only memory (ROM), a flash ROM, and a random access memory (RAM), and a recording medium such as a hard disk and a memory card.

The storage unit 130 includes a non-volatile information storage device that is a device or a medium that can be read by a computer. Various programs, data, and the like may be stored in the information storage device. The information storage device may be an optical disk such as an optical disk DVD or a CD, a hard disk drive, or various types of memories such as a card-type memory or a ROM. In addition, the control unit 110 may receive various programs, data, and the like via the communication network 4 and store the programs, the data, and the like in the storage unit 130.

The second communication unit 140 transmits information such as a calculation result of the control unit 110 to the server 2 via the communication network 4.

The operation unit 150 acquires operation data from the user and transmits the operation data to the control unit 110.

The control unit 110 includes a first observation point information acquisition unit 111, a second observation point information acquisition unit 112, a deflection waveform calculation unit 113, a moving object deflection waveform calculation unit 114, a displacement calculation unit 115, a coefficient value calculation unit 116, and an output processing unit 117.

Based on the observation information obtained by the N sensors 21 that observe the observation points $P_1$ to $P_N$, the first observation point information acquisition unit 111 performs processing of acquiring the first observation point information including the time point when each of the plurality of axles of the vehicle 6 passes each of the observation points $P_1$ to $P_N$, and the acceleration intensity as the physical quantity which is the response to the action of each of the plurality of axles on each of the observation points $P_1$ to $P_N$. That is, the first observation point information acquisition unit 111 performs the processing of the first observation point information acquisition step in FIG. 20. The first observation point information acquired by the first observation point information acquisition unit 111 is stored in the storage unit 130.

Based on the observation information obtained by the N sensors 22 that observe the observation points $Q_1$ to $Q_N$, the second observation point information acquisition unit 112 performs processing of acquiring the second observation point information including the time point when each of the plurality of axles of the vehicle 6 passes each of the observation points $Q_1$ to $Q_N$, and the acceleration intensity as the physical quantity which is the response to the action of each of the plurality of axles on each of the observation points $Q_1$ to $Q_N$. That is, the second observation point information acquisition unit 112 performs the processing of the second observation point information acquisition step in FIG. 20. The second observation point information acquired by the second observation point information acquisition unit 112 is stored in the storage unit 130.

Based on the first observation point information acquired by the first observation point information acquisition unit 111, the second observation point information acquired by the second observation point information acquisition unit 112, the predetermined coefficient p, and the approximate expression of deflection of the superstructure 7 based on the structural model of the superstructure 7, the deflection waveform calculation unit 113 performs processing of calculating the deflection waveform $H_{jk}(t)$ of the superstructure 7 generated by each of the plurality of axles. That is, the deflection waveform calculation unit 113 performs the processing of the deflection waveform calculation step in FIG. 20. The deflection waveform $H_{jk}(t)$ calculated by the deflection waveform calculation unit 113 is stored in the storage unit 130. The predetermined coefficient p and the approximate expression of deflection of the superstructure 7 are previously stored in the storage unit 130.

The moving object deflection waveform calculation unit 114 performs processing of calculating the deflection waveform $CP_{jm}(t)$ of the superstructure 7 generated by the vehicle 6 by adding the deflection waveform $H_{jk}(t)$ of the superstructure 7 generated by each of the plurality of axles of the vehicle 6 and calculated by the deflection waveform calculation unit 113. That is, the moving object deflection waveform calculation unit 114 performs the processing of the moving object deflection waveform calculation step in FIG. 20. The deflection waveform $CP_{jm}(t)$ calculated by the moving object deflection waveform calculation unit 114 is stored in the storage unit 130.

Based on the deflection waveform $CP_{jm}(t)$ of the superstructure 7 generated by the vehicle 6 calculated by the moving object deflection waveform calculation unit 114, the displacement calculation unit 115 performs processing of calculating the displacement $CU_{est}(t)$ of the superstructure 7. That is, the displacement calculation unit 115 performs the processing of the displacement calculation step in FIG. 20. The displacement $CU_{est}(t)$ calculated by the displacement calculation unit 115 is stored in the storage unit 130.

When each of the plurality of vehicles independently travels on the superstructure 7, the coefficient value calculation unit 116 performs processing of obtaining an approximate straight line that approximates the correlation between the maximum value of the displacement $CU_{max}$ of the superstructure 7 measured by a displacement meter (not shown) and the maximum value $CP_{jm-max}$ of the deflection waveform $CP_{jm}(t)$ calculated by the moving object deflection waveform calculation unit 114, and calculating the value of the first-order coefficient $s_{cu}$ and the value of the zero-order coefficient $i_{cu}$ of the above Equation (47). The value of the first-order coefficient $s_{cu}$ and the value of the zero-order coefficient $i_{cu}$ calculated by the coefficient value calculation unit 116 are stored in the storage unit 130.

The output processing unit 117 performs processing of outputting the displacement $CU_{est}(t)$ of the superstructure 7 calculated by the displacement calculation unit 115 to the server 2 via the second communication unit 140. That is, the output processing unit 117 performs the processing of the output step in FIG. 20.

For example, based on the operation data from the operation unit 150, the control unit 110 switches between a first mode for calculating the time point when an unknown vehicle 6 travels on the superstructure 7 and the displacement of the superstructure 7 and the like, and a second mode for calculating the value of the first-order coefficient $s_{cu}$ and the value of the zero-order coefficient $i_{cu}$. For example, after the N sensors 21 and the N sensors 22 are installed in the superstructure 7, the load test is performed on the plurality of vehicles in a state in which the control unit 110 is set to the second mode. After the load test ends, the control unit 110 is set to the first mode.

In the present embodiment, the control unit 110 is a processor that executes various programs stored in the storage unit 130. By executing a measurement program 131 stored in the storage unit 130, each function of the first observation point information acquisition unit 111, the second observation point information acquisition unit 112, the deflection waveform calculation unit 113, the moving object deflection waveform calculation unit 114, the displacement calculation unit 115, the coefficient value calculation unit 116, and the output processing unit 117 is implemented. In other words, the measurement program 131 is a program that causes the measurement device 1 as a computer to execute each procedure in the flowchart shown in FIG. 20.

In the processor, for example, functions of each part may be implemented by individual hardware, or the functions of each part may be implemented by integrated hardware. For example, the processor may include hardware. The hardware may include at least one of a circuit for processing a digital signal and a circuit for processing an analog signal. The processor may be a central processing unit (CPU), a graphics processing unit (GPU), a digital signal processor (DSP), or the like. The control unit 110 is implemented as a custom integrated circuit (IC) such as an application specific integrated circuit (ASIC), and may implement the functions of each part, or may implement the functions of each part by the CPU and the ASIC.

The control unit 110 may not include the coefficient value calculation unit 116. For example, the server 2 or another device may perform the processing of calculating the value of the first-order coefficient $s_{cu}$ and the value of the zero-order coefficient $i_{cu}$, and store the values in the storage unit 130 of the measurement device 1.

1-7. Operation Effects

In the measurement method according to the first embodiment described above, the measurement device 1 acquires, based on the observation information obtained by the N sensors 21 that observe the observation points $P_1$ to $P_N$, the first observation point information including the time point and the acceleration intensity when each of the plurality of axles of the vehicle 6 passes each of the observation points $P_1$ to $P_N$. The measurement device 1 acquires, based on the observation information obtained by the N sensors 22 that observe the observation points $Q_1$ to $Q_N$, the second observation point information including the time point and the acceleration intensity when each of the plurality of axles of the vehicle 6 passes each of the observation points $Q_1$ to $Q_N$. Next, based on the first observation point information, the second observation point information, the predetermined coefficient p, and the approximate expression (39) of deflection of the superstructure 7 based on the structural model of the superstructure 7, the measurement device 1 calculates the deflection waveform $H_{jk}(t)$ of the superstructure 7 generated by each axle according to Equation (44), and calculates the deflection waveform CP (t) of the superstructure 7 generated by the vehicle 6 by adding the deflection waveform $H_{jk}(t)$. Therefore, according to the measurement method in the first embodiment, the measurement device 1 can calculate the deflection waveform of the superstructure 7 generated by the vehicle 6 which is the moving object that moves on the superstructure 7 without measuring the displacement of the superstructure 7 which is the structure.

In the measurement method according to the first embodiment, according to the correlation equation (47), the measurement device 1 can calculate the displacement $CU_{est}(t)$ of the lane $L_j$ based on the deflection waveform CP (t) of the superstructure 7 generated by the vehicle 6. Therefore, according to the measurement method in the first embodiment, the measurement device 1 can estimate the displacement of the superstructure 7 without measuring the displacement of the superstructure 7.

In addition, according to the measurement method in the first embodiment, since it is not necessary to set the observation points for measuring the displacement of the superstructure 7, the number of observation points observed by the observation device is reduced. Further, since the measurement system is simplified, cost required for the measurement is reduced.

Further, according to the measurement method in the first embodiment, since the observation points $P_1$ to $P_N$ and $Q_1$ to $Q_N$ are set at both end portions of the superstructure 7, and no observation point is set at the central portion of the superstructure 7, construction and maintenance of the measurement system 10 are facilitated, and the cost required for measurement is reduced.

According to the measurement method in the first embodiment, since the measurement device 1 can calculate the deflection waveform which is the deformation of the superstructure 7 due to the axle load of the vehicle 6 passing through the superstructure 7, sufficient information can be provided for maintenance and management of the bridge 5 to predict the damage of the superstructure 7.

2. Second Embodiment

In the measurement method in the first embodiment, the measurement device 1 calculates the displacement $CU_{est}(t)$ of the superstructure 7 based on the deflection waveform $CP_{jm}(t)$ of the superstructure 7 generated by the vehicle 6. In contrast, in a measurement method according to a second embodiment, the measurement device 1 calculates a load generated by the vehicle 6 based on the deflection waveform $CP_{jm}(t)$ of the superstructure 7 generated by the vehicle 6. Hereinafter, the same components as those in the first embodiment will be denoted by the same reference numerals for the second embodiment, and the description repeated with the first embodiment will be omitted or simplified, and different contents from the first embodiment will be mainly described.

In the present embodiment, a correlation between the deflection waveform $CP_{jm}(t)$ expressed by the above Equation (45) and a virtual load CW(t) generated by the vehicle is approximated by a polynomial equation. For example, as in Equation (49), the load CW(t) is approximated by a linear equation of the deflection waveform $CP_{jm}(t)$. In Equation (49), s is a first-order coefficient, and i is a zero-order coefficient.

$$CW(t) \cong sCP_{jm}(t)+i \quad (49)$$

The first-order coefficient s and the zero-order coefficient i are calculated by, for example, a load test performed on a plurality of vehicles. For example, a weight of each of the plurality of vehicles is measured before the load test. Each of the plurality of vehicles independently travels on the lane $L_j$, and the measurement device 1 generates axle information and acquires the weight of each vehicle. Then, the measurement device 1 plots the weight of each vehicle as load $CW_{test}$ and the maximum value of the deflection waveform $CP_{jm}(t)$ obtained according to Equation (45) from the axle information as $CP_{jm\text{-}max}$ on a graph, and obtains the first-order coefficient $s_{cp}$ and the zero-order coefficient $i_{cp}$ of the approximate straight line.

Figure 23:
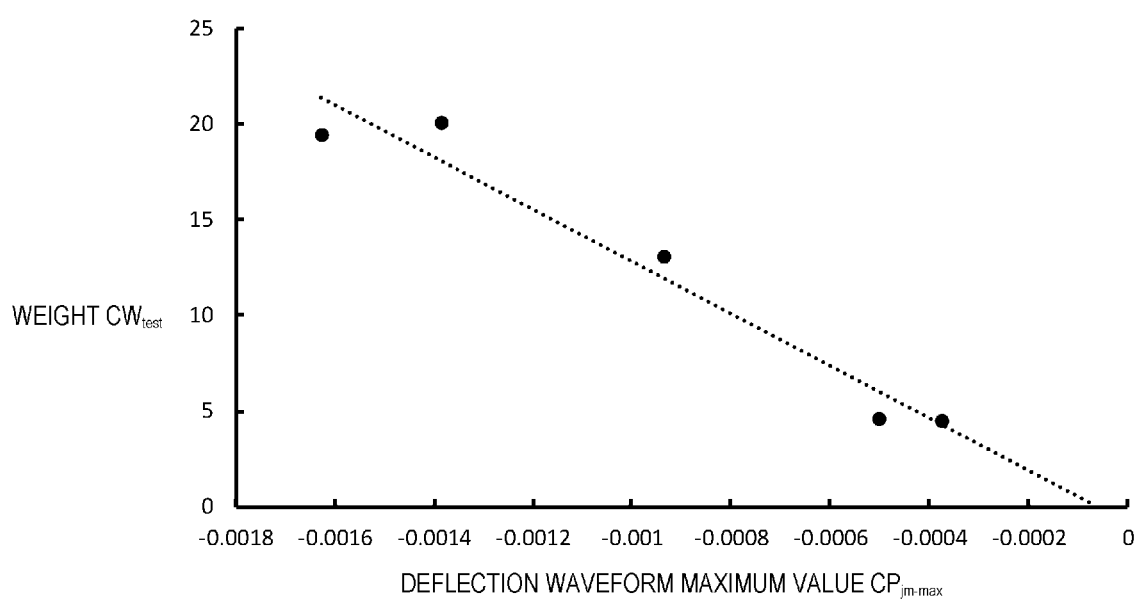
FIG. 23 is a diagram obtained by plotting a result of a load test.

FIG. 23 is a diagram obtained by plotting the results of the load test performed on five vehicles. In FIG. 23, the horizontal axis represents the maximum value $CP_{jm\text{-}max}$ of the deflection waveform of the superstructure 7 generated by the vehicle, and the vertical axis represents the weight $CW_{test}$ of the vehicle. In FIG. 23, the five points are arranged in a straight line, and an approximate straight line with respect to the six points is indicated by a dotted line. In the example in FIG. 23, in the approximate straight line, the first-order coefficient $s_{cp}$ is −13714.92504, and the zero-order coefficient $i_{cp}$ is −0.880179651.

The measurement device 1 calculates the load $CW_{est}(t)$ generated by the vehicle 6, according to Equation (50) and using the first-order coefficient $s_{cp}$, the zero-order coefficient $i_{cp}$, and the deflection waveform $CP_{jm}(t)$ obtained according to Equation (45) from axle information of an unknown vehicle 6.

$$CW_{est}(t) = s_{cp} CP_{jm}(t) + i_{cp} \quad (50)$$

Figure 24:
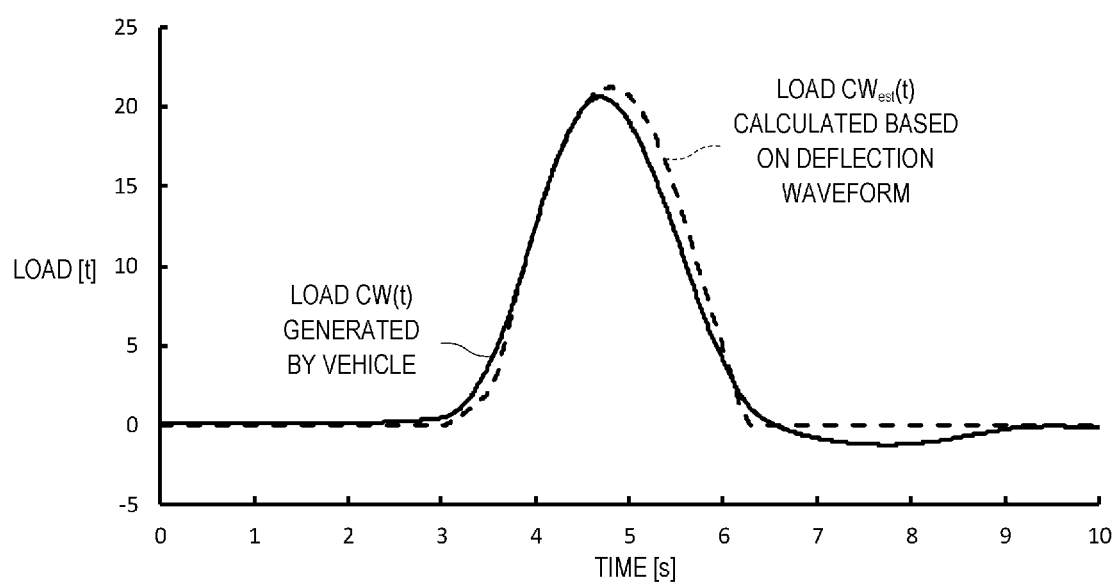
FIG. 24 is a diagram showing an example of a load generated by the vehicle and a load calculated based on the deflection waveform.

FIG. 24 shows an example of the load CW(t) generated by the vehicle and the virtual load $CW_{est}(t)$ calculated based on the deflection waveform $CP_{jm}(t)$. In FIG. 24, the solid line indicates the load CW(t) generated by the vehicle, and the broken line indicates the virtual load $CW_{est}(t)$ calculated based on the deflection waveform $CP_{jm}(t)$. As shown in FIG. 24, the load $CW_{est}(t)$ calculated based on the deflection waveform $CP_{jm}(t)$ approximates the load CW(t) generated by the vehicle. Therefore, the measurement device 1 can calculate the load generated by the unknown vehicle 6 traveling on the lane $L_j$ according to the equation (50) without measuring the displacement at the center of the lane $L_j$.

In Equation (50), the zero-order coefficient $i_{cp}$ is a small value. By substituting $i_{cp}=0$ into Equation (50), Equation (51) is obtained based on Equation (44) and Equation (45).

$$CW_{est}(t) = s_{cp} CP_{jm}(t) = s_{cp} \sum_k p a_{p_{jk}} w_{std}(t) = p \sum_k s_{cp} a_{p_{jk}} (3R - 4R^3) \quad (51)$$

According to Equation (51), since the predetermined coefficient p and the first-order coefficient $s_{cp}$ can be exchanged, the predetermined coefficient p is a coefficient having the same function as the first-order coefficient $s_{cp}$. That is, the predetermined coefficient p is a coefficient of a function that approximates the correlation between a deflection of a portion of the superstructure 7 between the observation point $P_j$ and the observation point Q and a load applied to the portion generated by the vehicle 6.

Figure 25:
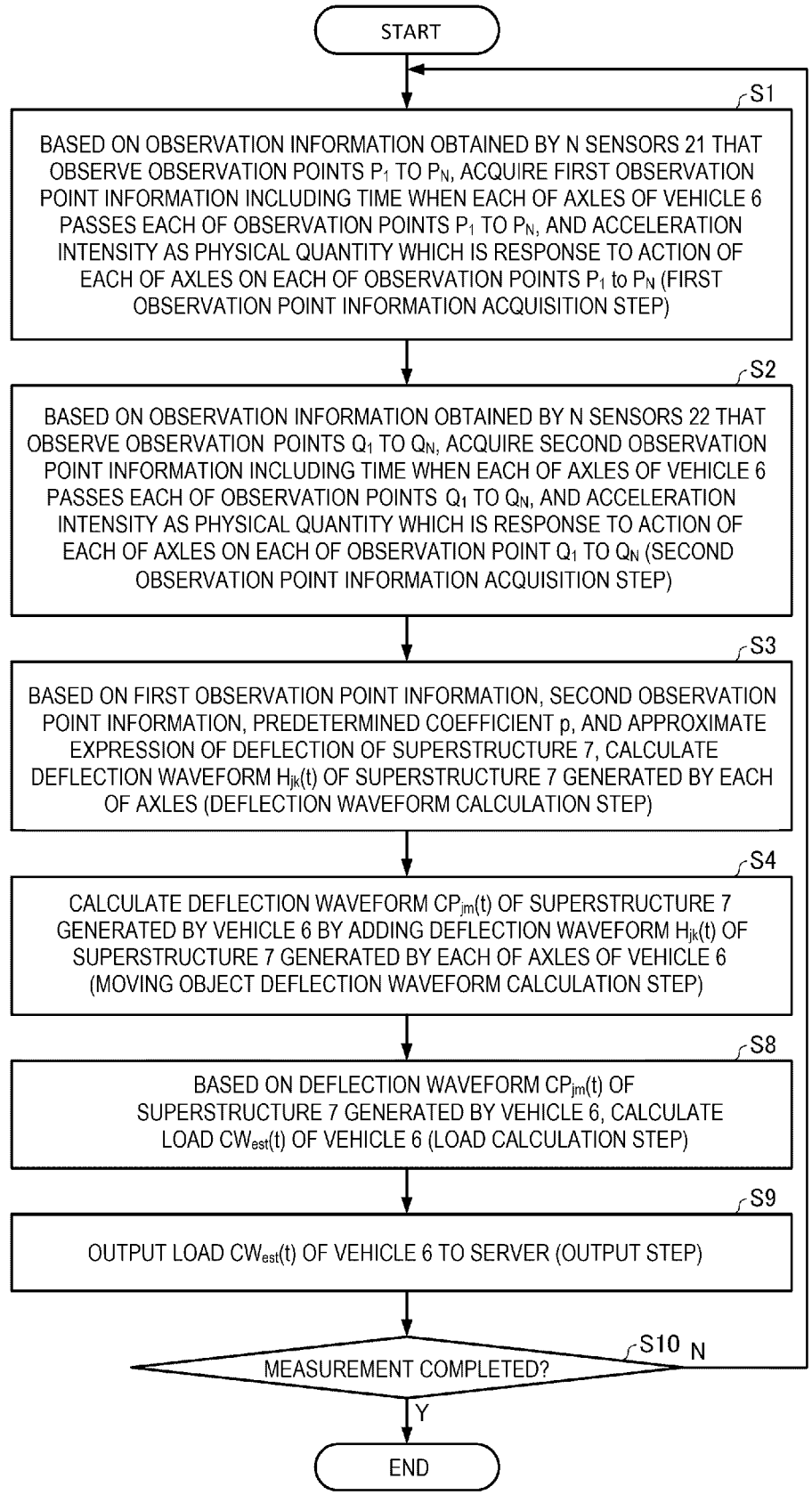
FIG. 25 is a flowchart showing an example of a procedure of a measurement method according to a second embodiment.

FIG. 25 is a flowchart showing an example of a procedure of the measurement method according to the second embodiment. In the present embodiment, the measurement device 1 executes the procedure shown in FIG. 25. In FIG. 25, the same steps as those in FIG. 20 are denoted by the same reference numerals, and the description thereof will be omitted.

As shown in FIG. 25, similar to the first embodiment, the measurement device 1 performs the processing in steps S1 to S4.

Next, based on the deflection waveform $CP_{jm}(t)$ of the superstructure 7 generated by the vehicle 6 calculated in step S4, the measurement device 1 calculates the virtual load $CW_{est}(t)$ generated by the vehicle 6 according to Equation (50) (step S8). The step S8 is a load calculation step.

Next, the measurement device 1 outputs the load $CW_{est}(t)$ generated by the vehicle 6 calculated in step S8 to the server 2 (step S9). The step S9 is an output step.

The measurement device 1 repeats the processing in steps S1 to S9 until the measurement is completed (N in step S10).

Figure 26:
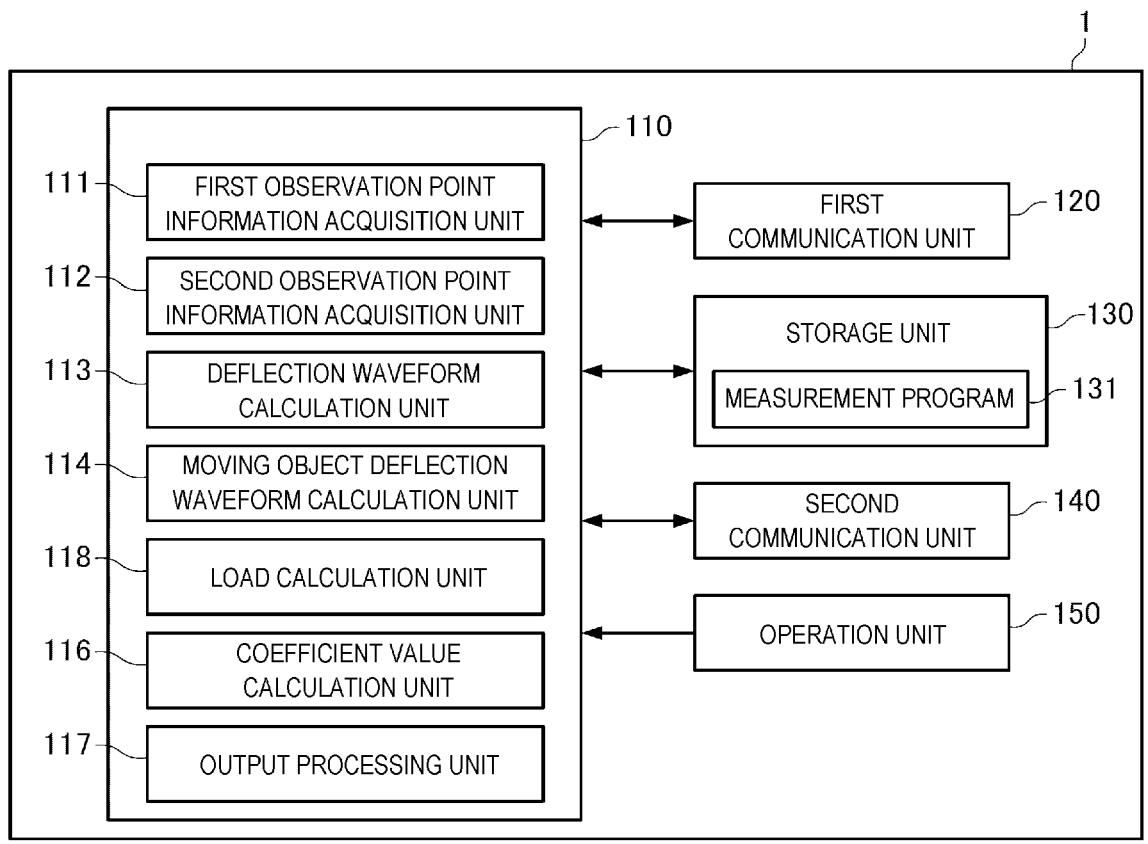
FIG. 26 is a diagram showing a configuration example of a measurement device according to the second embodiment.

FIG. 26 is a diagram showing a configuration example of the measurement device 1 according to the second embodiment. In FIG. 26, the same components as those in FIG. 22 are denoted by the same reference numerals. As shown in FIG. 26, similar to the first embodiment, the measurement device 1 includes the control unit 110, the first communication unit 120, the storage unit 130, the second communication unit 140, and the operation unit 150.

Since the processing performed by the first communication unit 120, the storage unit 130, the second communication unit 140, and the operation unit 150 are the same as those in the first embodiment, the description thereof will be omitted.

The control unit 110 calculates the time point when the vehicle 6 travels on the superstructure 7 or the load or the like generated by the vehicle 6 based on the acceleration data output from each of the sensors 21 and 22 installed in the superstructure 7.

The control unit 110 includes the first observation point information acquisition unit 111, the second observation point information acquisition unit 112, the deflection waveform calculation unit 113, the moving object deflection waveform calculation unit 114, a load calculation unit 118, the coefficient value calculation unit 116, and the output processing unit 117.

Since the processing performed by the first observation point information acquisition unit 111, the second observation point information acquisition unit 112, the deflection waveform calculation unit 113, and the moving object deflection waveform calculation unit 114 are the same as those in the first embodiment, the description thereof will be omitted.

Based on the deflection waveform CP (t) of the superstructure 7 generated by the vehicle 6 calculated by the moving object deflection waveform calculation unit 114, the load calculation unit 118 performs processing of calculating the load $CW_{est}(t)$ generated by the vehicle 6. That is, the load calculation unit 118 performs the processing of the load calculation step in FIG. 25. The load $CW_{est}(t)$ calculated by the load calculation unit 118 is stored in the storage unit 130.

When each of the plurality of vehicles independently travels on the superstructure 7, the coefficient value calculation unit 116 performs processing of obtaining an approximate straight line that approximates the correlation between the weight $CW_{test}$ of the vehicle and the maximum value $CP_{jm\text{-}max}$ of the deflection waveform $CP_{jm}(t)$ calculated by the moving object deflection waveform calculation unit 114, and calculating the value of the first-order coefficient $s_{cp}$ and the value of the zero-order coefficient $i_{cp}$ according to Equation (50). The value of the first-order coefficient $s_{cp}$ and the value of the zero-order coefficient $i_{cp}$ calculated by the coefficient value calculation unit 116 are stored in the storage unit 130.

The output processing unit 117 performs processing of outputting the load $CW_{est}(t)$ of the vehicle 6 calculated by the load calculation unit 118 to the server 2 via the second communication unit 140. That is, the output processing unit 117 performs the processing of the output step in FIG. 25.

For example, based on the operation data from the operation unit 150, the control unit 110 switches between a first mode for calculating the time point when an unknown vehicle 6 travels on the superstructure 7 and the load generated by the vehicle 6 and the like, and a second mode for calculating the value of a first-order coefficient $s_{cp}$ and the value of a zero-order coefficient $i_{cp}$. For example, after the N sensors 21 and the N sensors 22 are installed in the superstructure 7, the load test is performed on the plurality of vehicles in a state in which the control unit 110 is set to the second mode. After the load test ends, the control unit 110 is set to the first mode.

As in the first embodiment, the control unit 110 is a processor that executes various programs stored in the storage unit 130. By executing the measurement program 131 stored in the storage unit 130, each function of the first observation point information acquisition unit 111, the second observation point information acquisition unit 112, the deflection waveform calculation unit 113, the moving object deflection waveform calculation unit 114, the load calculation unit 118, the coefficient value calculation unit 116, and the output processing unit 117 is implemented. In other words, the measurement program 131 is a program that causes the measurement device 1 as a computer to execute each procedure in the flowchart shown in FIG. 25. The control unit 110 is implemented as a custom IC such as an ASIC, and may implement the functions of each part, or may implement the functions of each part by the CPU and the ASIC.

The control unit 110 may not include the coefficient value calculation unit 116. For example, the server 2 or another device may perform processing of calculating the value of the first-order coefficient $s_{cp}$ and the value of the zero-order coefficient $i_{cp}$, and store the values in the storage unit 130 of the measurement device 1.

According to the measurement method in the second embodiment as described above, as in the measurement method in the first embodiment, the measurement device 1 can calculate the deflection waveform of the superstructure 7 generated by the vehicle 6 which is the moving object that moves on the superstructure 7 without measuring the displacement of the superstructure 7 which is the structure.

In the measurement method according to the second embodiment, the measurement device 1 can calculate the load $CW_{est}(t)$ generated by the vehicle 6 from the deflection waveform $CP_{jm}(t)$ of the superstructure 7 generated by the vehicle 6 according to the correlation equation (50). Therefore, according to the measurement method in the second embodiment, the measurement device 1 can estimate the load applied to the superstructure 7 by the vehicle 6 without measuring the displacement of the superstructure 7.

Further, according to the measurement method in the second embodiment, as in the measurement method in the first embodiment, the cost required for the measurement is reduced.

3. Third Embodiment

In the measurement method according to the first and second embodiments, since the approximate expression of deflection of the superstructure 7 is set to be an equation based on the structural model of the superstructure 7, as shown in Equation (29), the normalized deflection amount $w_{std}$ differs in an interval in which the load position a is smaller than $l/2$ and an interval in which the load position a is larger than $l/2$. In contrast, in a measurement method according to a third embodiment, the approximate expression of deflection of the superstructure 7 is approximated to an expression of a sinusoidal half-wave waveform in order to make the normalized deflection amount $w_{std}$ in the interval in which the load position a is smaller than $l/2$ equal to the normalized deflection amount $w_{std}$ in the interval in which the load position a is larger than $l/2$. Hereinafter, the same components as those of the first embodiment or the second embodiment will be denoted by the same reference numerals for the third embodiment, and description repeated with the first embodiment or the second embodiment will be omitted or simplified, and different contents from the first embodiment and second embodiment will be mainly described.

In the present embodiment, the normalized deflection amount $w_{std}$ is expressed by Equation (52).

$$w_{std} = \frac{w}{w_{max}} = \sin\left(a\frac{\pi}{l}\right) \quad (52)$$

In Equation (52), since the load position a is in a range of $0 \le a \le l$, the normalized deflection amount $w_{std}$ is approximated to a sine half wave according to Equation (52).

Figure 27:
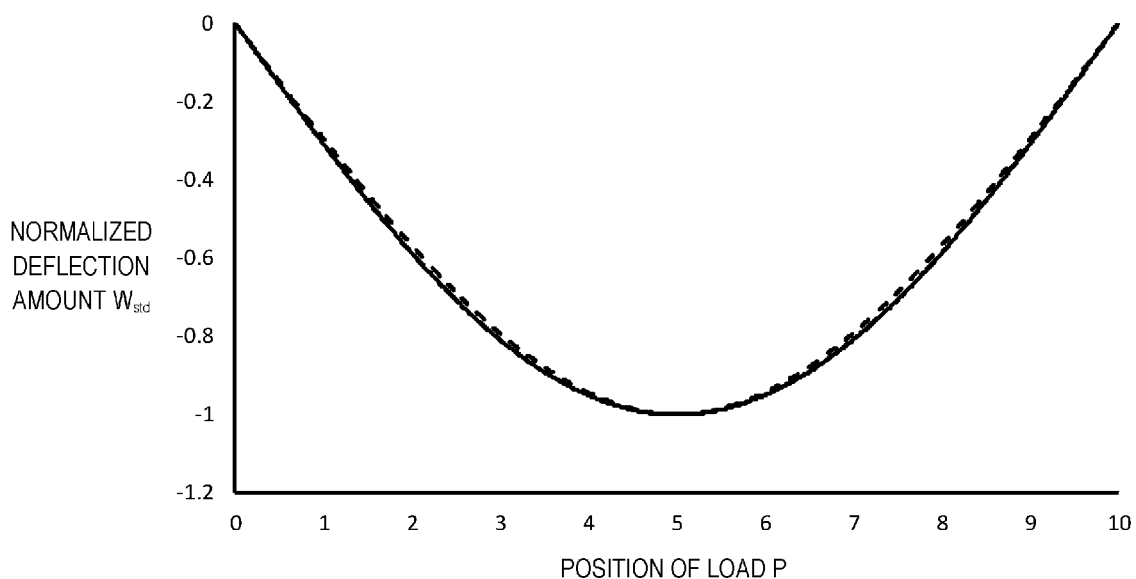
FIG. 27 shows an example of a waveform of a normalized deflection amount waveform according to a third embodiment.

FIG. 27 shows, by a solid line, an example of a waveform of the normalized deflection amount $w_{std}$ calculated according to Equation (52) in a case of the observation position $x=l/2$. In FIG. 27, the horizontal axis represents the position of the load P, and the vertical axis represents the normalized deflection amount $w_{std}$. In the example in FIG. 27, the distance $l$ between the fulcrums of the simple beam is 10. FIG. 27 shows, by a broken line, a waveform of the normalized deflection amount $w_{std}$ calculated according to Equation (29).

As shown in FIG. 27, the waveform of the normalized deflection amount $w_{std}$ calculated according to Equation (52) is similar to the waveform of the normalized deflection amount $w_{std}$ calculated according to Equation (29), and Equation (29) can be replaced by Equation (52). According to the replacement, Equation (39) can be replaced with Equation (53). Equation (53) is an expression normalized in a manner that the maximum value thereof is 1. Equation (53) is an approximate expression of deflection of the superstructure 7 which is the structure, and is an expression of a sinusoidal half-wave waveform.

$$w_{std}(t) = \begin{cases} 0 \; (\text{if } t < t_i) \\ \sin\left(a\frac{\pi}{l}\right) = \sin\left(\frac{t-t_i}{t_o-t_i}\pi\right) (\text{if } t_i < t < t_o) \\ 0 \; (\text{if } t > t_o) \end{cases} \quad (53)$$

According to Equation (53), Equation (44) can be replaced with Equation (54).

$$H_{jk}(t) = \begin{cases} 0 \; (\text{if } t < t_i) \\ pa_{p_{jk}}\sin\left(a\frac{\pi}{l}\right) = pa_{p_{jk}}\sin\left(\frac{t-t_i}{t_o-t_i}\pi\right) (\text{if } t_i < t < t_o) \\ 0 \; (\text{if } t > t_o) \end{cases} \quad (54)$$

The deflection waveform calculation unit 113 calculates, according to Equation (54), the deflection waveform $H_{jk}(t)$ of the superstructure 7 generated by each axle of the vehicle 6 traveling on the lane $L_j$.

According to Equation (45), the moving object deflection waveform calculation unit 114 calculates the deflection waveform $CP_{jm}(t)$ of the superstructure 7 generated by the vehicle 6 whose vehicle number is m by adding the deflection waveforms $H_{jk}(t)$ calculated by the deflection waveform calculation unit 113.

The displacement calculation unit 115 calculates the displacement $CU_{est}(t)$ at the center of the lane $L_j$ according to Equation (47) and using the first-order coefficient $s_{cu}$, the zero-order coefficient $i_{cu}$ and the deflection waveform $CP_{jm}(t)$ calculated by the moving object deflection waveform calculation unit 114.

Alternatively, the load calculation unit 118 calculates the load $CW_{est}(t)$ generated by the vehicle 6 according to Equation (50) and using the first-order coefficient $s_{cp}$, the zero-order coefficient $i_{cp}$ and the deflection waveform $CP_{jm}(t)$ calculated by the moving object deflection waveform calculation unit 114.

In the third embodiment as described above, based on the first observation point information, the second observation point information, the predetermined coefficient p, and the approximate expression (53) of deflection of the superstructure 7 which is an expression of a sinusoidal half-wave waveform, the measurement device 1 calculates the deflection waveform $H_{jk}(t)$ of the superstructure 7 generated by each axle according to Equation (54), and calculates the deflection waveform $CP_{jm}(t)$ of the superstructure 7 generated by the vehicle 6 by adding the deflection waveform $H_{jk}(t)$. Therefore, according to the measurement method in the third embodiment, the measurement device 1 can calculate the deflection waveform of the superstructure 7 generated by the vehicle 6 which is the moving object that moves on the superstructure 7 without measuring the displacement of the superstructure 7 which is the structure.

In addition, according to the measurement method in the third embodiment, similar to the measurement method in the first embodiment and the measurement method in the second embodiment, the measurement device 1 can estimate the displacement of the superstructure 7 or the load applied to the superstructure 7 generated by the vehicle 6 without measuring the displacement of the superstructure 7.

Further, according to the measurement method in the third embodiment, similar to the measurement method in the first embodiment and the measurement method in the second embodiment, the cost required for the measurement is reduced.

4. Modifications

The present disclosure is not limited to the above embodiments, and various modifications can be made within the scope of the gist of the present disclosure.

Further, in each of the above embodiments, the measurement device 1 calculates any one of the displacement and the load of the superstructure 7. However, both the displacement and the load of the superstructure 7 may be calculated. For example, the measurement device 1 may calculate the displacement $CU_{est}(t)$ according to the above Equation (47) and calculate the load $CW_{est}(t)$ according to the above Equation (50).

Further, the measurement device 1 calculates the displacement $CU_{est}(t)$ using Equation (47). However, the displacement $CU_{est}(t)$ may be converted into a load using a predetermined correlation equation. For example, the relationship between the load $CW_k(t)$ and the displacement $x_k(t)$ at the observation position $R_k$ of the superstructure 7 is expressed by Equation (55). Here, the load $CW_k(t)$ is a load waveform corresponding to the displacement waveform in BWIM. A first-order coefficient $Sck_k$ and a zero-order coefficient $Ick$ in Equation (55) are obtained by a load test performed on a plurality of vehicles.

$$CW_k(t)=Sc_{kk}\cdot x_k(t)+Ic_k \tag{55}$$

When $Ick$ is sufficiently small in Equation (55), Equation (56) is obtained.

$$CW_k(t)=Sc_{kk}\cdot x_k(t) \tag{56}$$

In Equation (56), the displacement $x_k(t)$ is replaced with the displacement $CU_{est}(t)$, and a correlation equation between the load $CW_k(t)$ and the displacement $CU_{est}(t)$ is expressed by Equation (57). The measurement device 1 can convert the displacement $CU_{est}(t)$ into the load $CW_k(t)$ according to the correlation Equation (57).

$$CW_k(t)=Sc_{kk}(t)\cdot CU_{est}(t) \tag{57}$$

Further, the measurement device 1 calculates the load $CW_{est}(t)$ according to Equation (50). However, the load $CW_{est}(t)$ may be converted into a displacement using a predetermined correlation equation. In Equation (56), when the load $CW_k(t)$ is replaced with the load $CW_{est}(t)$ and arranged, the correlation equation between the displacement $x_k(t)$ and the load $CW_{est}$ is expressed by Equation (58). The measurement device 1 can convert the load $CW_k(t)$ into the displacement $x_k(t)$ according to the correlation Equation (58).

$$x_k(t)=\frac{CW_{est}(t)}{Sc_{kk}} \tag{58}$$

In each of the above embodiments, the observation device that observes observation points $P_1$ to $P_N$ and the observation device that observes observation points $Q_1$ to $Q_N$ are acceleration sensors, but the present disclosure is not limited thereto. For example, the observation device may be an impact sensor, a microphone, a strain gauge, or a load cell. It is not necessary that the observation device and the observation point have a one-to-one correspondence, and one observation device may observe apart or all of the observation points $P_1$ to $P_N$ and $Q_1$ to $Q_N$.

The impact sensor detects an impact acceleration as a response to the action of each axle of the vehicle 6 on the observation points $P_1$ to $P_N$ and $Q_1$ to $Q_N$. The measurement device 1 acquires first observation point information based on the impact acceleration for the observation points $P_1$ to $P_N$, and acquires second observation point information based on the impact acceleration for the observation points $Q_1$ to $Q_N$. The microphone detects sound as a response to the action of each axle of the vehicle 6 on the observation points $P_1$ to $P_N$ and $Q_1$ to $Q_N$. The measurement device 1 acquires first observation point information based on the sound for the observation points $P_1$ to $P_N$, and acquires second observation point information based on the sound for the observation points $Q_1$ to $Q_N$. The strain gauge and the load cell detect a stress change as a response to the action of each axle of the vehicle 6 on the observation points $P_1$ to $P_N$ and $Q_1$ to $Q_N$. The measurement device 1 acquires first observation point information based on the stress change for the observation points $P_1$ to $P_N$, and acquires second observation point information based on the stress change for the observation points $Q_1$ to $Q_N$.

In each of the above embodiments, the direction in which the vehicle 6 travels on the lanes $L_1$ to $L_N$ is all the same. Alternatively, the traveling direction of the vehicle 6 may be different from at least one lane of the lanes $L_1$ to $L_N$ and other lanes. For example, the vehicle 6 may travel in a direction from the observation point $P_1$ to the observation point $Q_1$ on the lane $L_1$, and may travel in a direction from the observation point $Q_2$ to the observation point $P_2$ on the lane $L_2$. In this case, the measurement device 1 acquires the entry time point of the vehicle 6 to the lane $L_1$ based on the acceleration data output from the sensor 21 that observes the observation point $P_1$, and acquires the exit time point of the vehicle 6 from the lane $L_1$ based on the acceleration data output from the sensor 22 that observes the observation point $Q_1$. The measurement device 1 acquires the entry time point of the vehicle 6 to the lane $L_2$ based on the acceleration data output from the sensor 22 that observes the observation point $Q_2$, and acquires the exit time point of the vehicle 6 from the lane $L_2$ based on the acceleration data output from the sensor 21 that observes the observation point $P_2$.

In each of the above embodiments, the sensors 21 and 22 are provided on the main girder G of the superstructure 7. Alternatively, the sensors may be provided on the surface or inside of the superstructure 7, a lower surface of the floor plate F, the bridge pier 8a, or the like. In each of the above embodiments, the road bridge is taken as an example of the bridge 5, but the present disclosure is not limited thereto. For example, the bridge 5 may be a railway bridge. In each of the above embodiments, the superstructure of the bridge is taken as an example of the structure, but the present disclosure is not limited thereto. The structure may be deformed by the movement of the moving object.

The embodiments and the modifications described above are merely examples, and the present disclosure is not limited thereto. For example, the embodiments and the modifications can be combined as appropriate.

The present disclosure includes a configuration substantially the same as the configuration described in the embodiments, for example, a configuration having the same function, method, and result, or a configuration having the same object and effect. The present disclosure includes a configuration in which a non-essential portion of the configuration described in the embodiment is replaced. In addition, the present disclosure includes a configuration having the same action effect as the configuration described in the embodiment, or a configuration capable of achieving the same object. The present disclosure includes a configuration in which a known technique is added to the configuration described in the embodiment.

What is claimed is:

1. A measurement method for causing a processor to execute a program stored in a memory, three axes perpendicular to each other being defined as an X axis, a Y axis, and a Z axis, the measurement method comprising executing the program on the processor the steps of:
    acquiring first observation point information, based on observation information obtained by a first sensor that observes a first observation point among the first observation point and a second observation point which are arranged along the X axis in which a moving object moves on a structure, the first observation point information including a first time point t1 when each of a plurality of parts of the moving object passes the first observation point and a first acceleration strength ap1 along the three axes which is a response to an action corresponding to first accelerations along the three axes of each of the plurality of parts on the first observation point;
    acquiring second observation point information, based on observation information obtained by a second sensor that observes the second observation point, the second observation point information including a second time point t2 when each of the plurality of parts passes the second observation point and a second acceleration strength ap2 along the three axes which is a response to an action corresponding to second accelerations along the three axes of each of the plurality of parts on the second observation point;
    calculating, based on the first observation point information, the second observation point information, a predetermined coefficient p, and approximate expressions wstd(t1) and wstd(t2) of deflection of the structure, first and second deflection waveforms H(t1) and H(t2) of the structure generated by each of the plurality of parts by using expressions below:

$$H(t1)=p \times ap1 \times wstd(t1); \text{ and}$$

$$H(t2)=p \times ap2 \times wstd(t2);$$

calculating a total deflection waveform of the structure generated by the moving object by adding the first and second deflection waveforms H(t1) and H(t2) of the structure generated by each of the plurality of parts; and
    obtaining a displacement amount along the Z axis at a center of the structure along the X axis due to movement of the moving object on the structure based on the total deflection waveform,
    wherein the moving object is a railroad vehicle, an automobile, a tram, a construction vehicle, or a military vehicle, and
    the plurality of parts are axles or wheels.

2. The measurement method according to claim 1, wherein
    the structure has a first end portion and a second end portion opposite to each other along the X axis,
    the first observation point is set at the first end portion of the structure, and
    the second observation point is set at the second end portion of the structure different from the first end portion.

3. The measurement method according to claim 1, wherein
    each of the first and second approximate expressions wstd(t1) and wstd(t2) of deflection of the structure is an expression based on a structural model of the structure.

4. The measurement method according to claim 3, wherein
    the structural model is a simple beam that supports both ends.

5. The measurement method according to claim 1, wherein
    each of the first and second approximate expressions wstd(t1) and wstd(t2) of deflection of the structure is an expression of a sinusoidal half-wave waveform.

6. The measurement method according to claim 1, wherein
    the structure is a superstructure of a bridge,
    the superstructure is a structure across any one of a bridge abutment and a bridge pier adjacent to each other, two adjacent bridge abutments, or two adjacent bridge piers, both end portions of the superstructure are located at positions of the bridge abutment and the bridge pier adjacent to each other, at positions of the two adjacent bridge abutments, or at positions of the two adjacent bridge piers, and the bridge is a road bridge or a railway bridge.

7. The measurement method according to claim 1, wherein the predetermined coefficient p is a coefficient of a function that approximates a correlation between a deflection of a portion of the structure between the first observation point and the second observation point and a displacement of the portion of the structure or a load applied to the portion of the structure.

8. The measurement method according to claim 1, wherein each of the first and second sensors is an acceleration sensor.

9. The measurement method according to claim 1, wherein each of the first and second sensors is an impact sensor, a microphone, a strain gauge, or a load cell.

10. The measurement method according to claim 1, wherein the structure is a structure in which bridge weigh in motion (BWIM) functions.

11. A measurement device comprising:

three axes perpendicular to each other being defined as an X axis, a Y axis, and a Z axis;

a memory configured store a program; and a processor configured to execute the program so as to:

cause a first sensor to obtain first sensor information of a first observation point of a structure, the first sensor being disposed at the first observation point of the structure;

cause a second sensor to obtain second sensor information of a second observation point of the structure, the second sensor being disposed at the second observation point of the structure, a moving object moving on the structure along the X axis, the first and second observation points being arranged along the X axis;

acquire first observation point information based on the first sensor information, the first observation point information including a first time point t1 when each of a plurality of parts of the moving object passes the first observation point and a first acceleration strength ap1 along the three axes which is a response to an action corresponding to first accelerations along the three axes of each of the plurality of parts on the first observation point;

acquire second observation point information based on the second sensor information, the second observation point information including a second time point t2 when each of the plurality of parts passes the second observation point and a second acceleration strength ap2 along the three axes which is a response to an action corresponding to second accelerations along the three axes of each of the plurality of parts on the second observation point;

calculate, based on the first observation point information, the second observation point information, a predetermined coefficient p, and approximate expressions wstd(t1) and wstd(t2) of deflection of the structure, first and second deflection waveforms H(t1) and H(t2) of the structure generated by each of the plurality of parts by using expressions below:

$H(t1) = p \times ap1 \times wstd(t1)$; and $H(t2) = p \times ap2 \times wstd(t2)$;

calculate a total deflection waveform of the structure generated by the moving object by adding the first and second deflection waveforms H(t1) and H(t2) of the structure generated by each of the plurality of parts; and obtaining a displacement amount along the Z axis at a center of the structure along the X axis due to movement of the moving object on the structure based on the total deflection waveform, wherein the moving object is a railroad vehicle, an automobile, a tram, a construction vehicle, or a military vehicle, and the plurality of parts are axles or wheels.

12. A measurement system comprising:

the measurement device according to claim 11;

the first sensor configured to obtain the first sensor information of the first observation point of the structure; and the second sensor configured to obtain the second sensor information of the second observation point of the structure.

13. A non-transitory computer-readable storage medium storing a measurement program, three axes perpendicular to each other being defined as an X axis, a Y axis, and a Z axis, the measurement program causing a computer to execute a process by a processor so as to perform the steps of:

acquiring first observation point information, based on observation information obtained by a first sensor that observes a first observation point among the first observation point and a second observation point which are arranged along the X axis in which a moving object moves on a structure, the first observation point information including a first time point t1 when each of a plurality of parts of the moving object passes the first observation point and a first acceleration strength ap1 along the three axes which is a response to an action corresponding to first accelerations along the three axes of each of the plurality of parts on the first observation point;

acquiring second observation point information, based on observation information obtained by a second sensor that observes the second observation point, the second observation point information including a second time point t2 when each of the plurality of parts passes the second observation point and a second acceleration strength ap2 along the three axes which is a response to an action corresponding to second accelerations along the three axes of each of the plurality of parts on the second observation point;

calculating, based on the first observation point information, the second observation point information, a predetermined coefficient p, and approximate expressions wstd(t1) and wstd(t2) of deflection of the structure, first and second deflection waveforms H(t1) and H(t2) of the structure generated by each of the plurality of parts by using expressions below:

$H(t1) = p \times ap1 \times wstd(t1)$; and $H(t2) = p \times ap2 \times wstd(t2)$;

calculating a total deflection waveform of the structure generated by the moving object by adding the first and second deflection waveforms H(t1) and H(t2) of the structure generated by each of the plurality of parts; and obtaining a displacement amount along the Z axis at a center of the structure along the X axis due to movement of the moving object on the structure based on the total deflection waveform, wherein the moving object is a railroad vehicle, an automobile, a tram, a construction vehicle, or a military vehicle, and the plurality of parts are axles or wheels.

* * * * *